(12) United States Patent
Lal et al.

(10) Patent No.: US 12,660,019 B2
(45) Date of Patent: Jun. 16, 2026

(54) SYSTEMS AND METHODS FOR ENHANCED VIDEO DOORBELL EXPERIENCES

(71) Applicant: Adeia Guides Inc., San Jose, CA (US)

(72) Inventors: Dhananjay Lal, Englewood, CO (US); Reda Harb, Tampa, FL (US); Aldis Sipolins, Somerville, MA (US); Serhad Doken, Bryn Mawr, PA (US)

(73) Assignee: ADEIA GUIDES INC., San Jose, CA (US)

( * ) Notice: Subject to any disclaimer, the term of this patent is extended or adjusted under 35 U.S.C. 154(b) by 107 days.

(21) Appl. No.: 18/620,633

(22) Filed: Mar. 28, 2024

(65) Prior Publication Data

US 2025/0311027 A1 Oct. 2, 2025

(51) Int. Cl.
| | |
|---|---|
| *H04W 76/14* | (2018.01) |
| *H04N 7/18* | (2006.01) |
| *H04W 52/28* | (2009.01) |
| *H04W 84/18* | (2009.01) |

(52) U.S. Cl.
CPC ......... *H04W 76/14* (2018.02); *H04W 52/283* (2013.01); *H04N 7/186* (2013.01); *H04W 84/18* (2013.01)

(58) Field of Classification Search
CPC ... H04W 76/14; H04W 52/283; H04W 84/18; H04N 7/186
See application file for complete search history.

(56) References Cited

U.S. PATENT DOCUMENTS

| | | | | |
|---|---|---|---|---|
| 8,078,164 B2 * | 12/2011 | Ganesan | ............... | H04W 24/08 |
| | | | | 455/437 |
| 9,230,424 B1 * | 1/2016 | Scalisi | ................... | H04N 7/186 |
| 9,646,400 B2 * | 5/2017 | Weerasinghe | ......... | H04N 7/186 |
| 10,341,812 B2 * | 7/2019 | Moisio | ................... | H04W 4/023 |
| 10,361,880 B1 * | 7/2019 | Marcinkowski | ......... | G07C 9/32 |
| 10,764,821 B2 * | 9/2020 | Xiang | ................... | H04W 48/18 |

(Continued)

OTHER PUBLICATIONS

A. Decurninge et al., "CSI-based Outdoor Localization for Massive MIMO: Experiments with a Learning Approach," 2018 15th International Symposium on Wireless Communication Systems (ISWCS), Lisbon, Portugal, 2018, pp. 1-6.

(Continued)

*Primary Examiner* — Thomas D Alunkal
(74) *Attorney, Agent, or Firm* — HG LAW LLP

(57) ABSTRACT

Systems and methods are described for enabling wireless communications and various types of engagement between a smart doorbell and a visitor's mobile device based on meeting certain criteria. Systems and methods are also described for establishing peer-to-peer communications between smart doorbells that are joined into a neighborhood watch program for providing alerts and reporting suspicious activity. A geofence around the smart doorbell is set up and a determination is made whether a visitor mobile device is within the generated geofence. If within the geofence, the UI of the visitor mobile device displays the smart doorbell and allows the visitor mobile device to virtually ring the doorbell or communicate with the doorbell if the visitor mobile device satisfies communication criteria of the doorbell. An encrypted peer-to-peer communication is set up, and communication between the doorbell and the visitor mobile device is established.

19 Claims, 14 Drawing Sheets

(56) References Cited

U.S. PATENT DOCUMENTS

| | | | | |
|---|---|---|---|---|
| 11,243,959 | B1 | 2/2022 | Gilboa et al. | |
| 11,393,108 | B1 | 7/2022 | Modestine et al. | |
| 2004/0229569 | A1* | 11/2004 | Franz | H04M 3/16 |
| | | | | 455/66.1 |
| 2016/0364616 | A1 | 12/2016 | Mclean et al. | |
| 2017/0337790 | A1 | 11/2017 | Gordon-Carroll et al. | |
| 2018/0113577 | A1 | 4/2018 | Burns et al. | |
| 2018/0341835 | A1 | 11/2018 | Siminoff | |
| 2019/0087561 | A1* | 3/2019 | Kumar | G06F 21/32 |
| 2019/0327128 | A1* | 10/2019 | Harpole | H04L 45/28 |
| 2019/0342527 | A1 | 11/2019 | Siminoff | |
| 2021/0019645 | A1 | 1/2021 | Petrey, Jr. | |
| 2021/0029298 | A1 | 1/2021 | Mysore et al. | |
| 2021/0075669 | A1 | 3/2021 | Hutz | |
| 2021/0097295 | A1 | 4/2021 | Sharma et al. | |
| 2021/0204107 | A1 | 7/2021 | Lindholm et al. | |
| 2022/0070415 | A1* | 3/2022 | Trundle | G06V 40/103 |
| 2022/0122391 | A1 | 4/2022 | Carter | |
| 2022/0188953 | A1 | 6/2022 | Child et al. | |
| 2022/0295019 | A1* | 9/2022 | Madden | H04N 7/186 |
| 2023/0186700 | A1* | 6/2023 | Arriaga | G07C 9/00563 |
| | | | | 382/124 |
| 2025/0310487 | A1 | 10/2025 | Lal et al. | |

OTHER PUBLICATIONS

Connectivity Standards Alliance, (https://csa-iot.org/), (5 pages).

Home Connectivity Alliance,(https://homeconnectivityalliance.org/), (2 pages).

Justin Croxton, "What is Geofencing and How Does it Work ?. . . Location Based Software", (https://propellant.media/what-is-geofencing/), (8 pages).

Mindy Woodall, "The Most Popular Smart Home Devices" (Reviews.org), (https://www.reviews.org/home-security/most-popular-smart-home-device-statistics/),(6 pages).

SDM Editors, "Amazon Ring Tops Video Doorbell Market, Says Strategy Analytics", (Jun. 22, 2022), (https://www.sdmmag.com/articles/100897-amazon-ring-tops-video-doorbell-market-says-strategy-analytics), (14 pages).

Zachary Comeau, "Video Doorbell Adoption Rises to 20% in U.S." (Parks Associates), (https://parksassociates.com/blogs/in-the-news/video-doorbell-adoption-rises-to-20-in-us), (2 pages).

U.S. Appl. No. 18/620,656, filed Mar. 28, 2024, Dhananjay Lal.

Zachary Comeau, "Video Doorbell Adoption Rises to 20% in U.S." (Parks Associates), (Sep. 27, 2023), (https://parksassociates.com/blogs/in-the-news/video-doorbell-adoption-rises-to-20-i n-US), (2 pages).

* cited by examiner

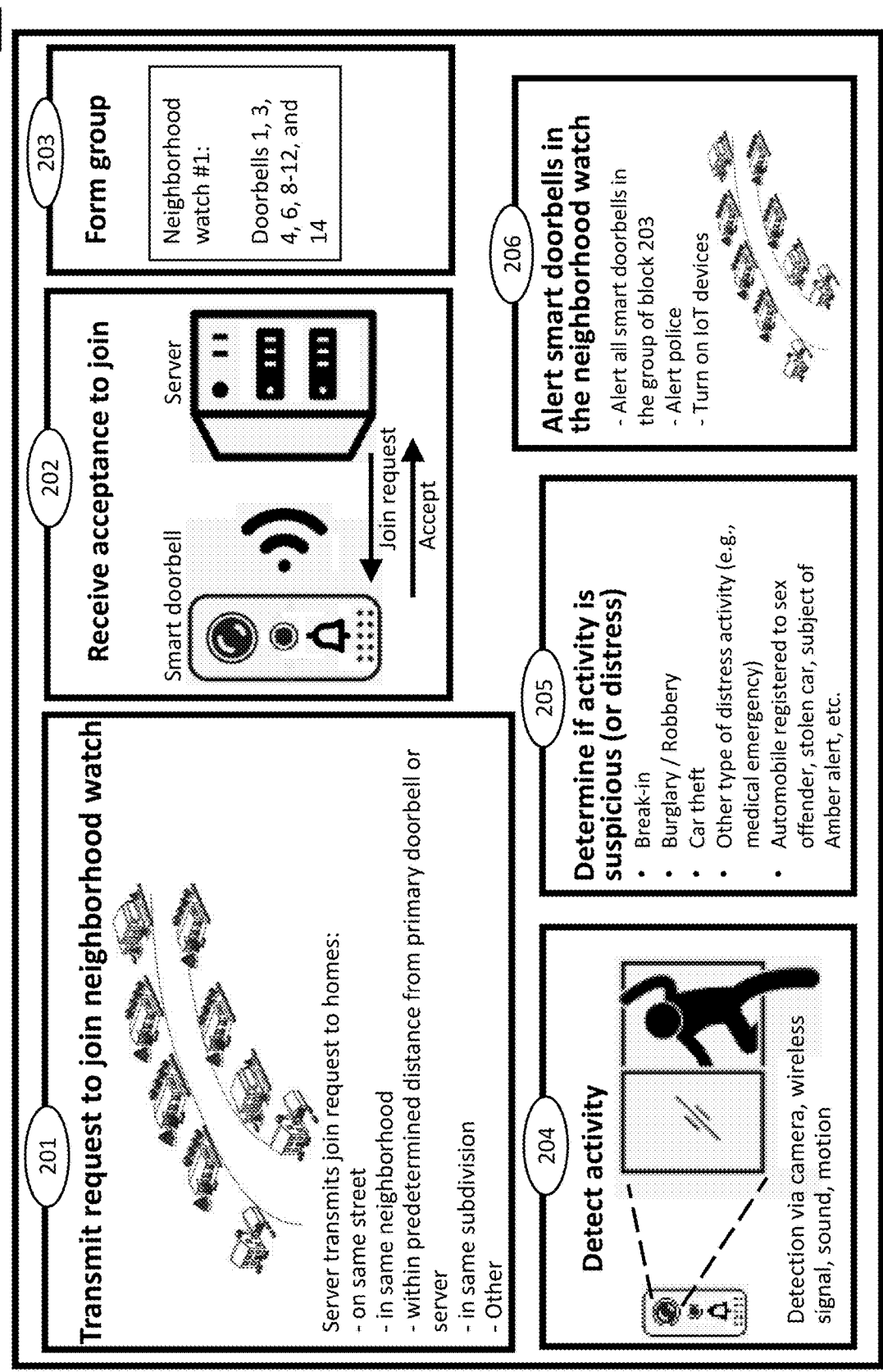

201 Transmit request to join neighborhood watch

Server transmits join request to homes:
- on same street
- in same neighborhood
- within predetermined distance from primary doorbell or server
- in same subdivision
- Other

202 Receive acceptance to join

Server

Smart doorbell

Join request

Accept

203 Form group

Neighborhood watch #1:

Doorbells 1, 3, 4, 6, 8-12, and 14

204 Detect activity

Detection via camera, wireless signal, sound, motion

205 Determine if activity is suspicious (or distress)

- Break-in
- Burglary / Robbery
- Car theft
- Other type of distress activity (e.g., medical emergency)
- Automobile registered to sex offender, stolen car, subject of Amber alert, etc.

206 Alert smart doorbells in the neighborhood watch

- Alert all smart doorbells in the group of block 203
- Alert police
- Turn on IoT devices

| Name | In contact list? | Attributes and context | Type of communication options allowed |
|---|---|---|---|
| Jane Doe 1 | Yes | Friend, scheduled to visit (based on an exchanged text message) | All types |
| John Doe 1 | No | Advertiser | Message via a provided email |
| John Doe 2 | No | Neighbor | Call or text |
| Jane Doe 2 | Yes | Gardener | Text |
| John Doe 3 | No | Pizza delivery person | Ring/Press doorbell |
| John Doe 3 | No | None provided | Do not provide any communication options |
| Fed-Ex Driver | No | Delivering package and needs signature | Text |
| John Doe 4 | No | Receive electronic file containing visitor information | Text or email |

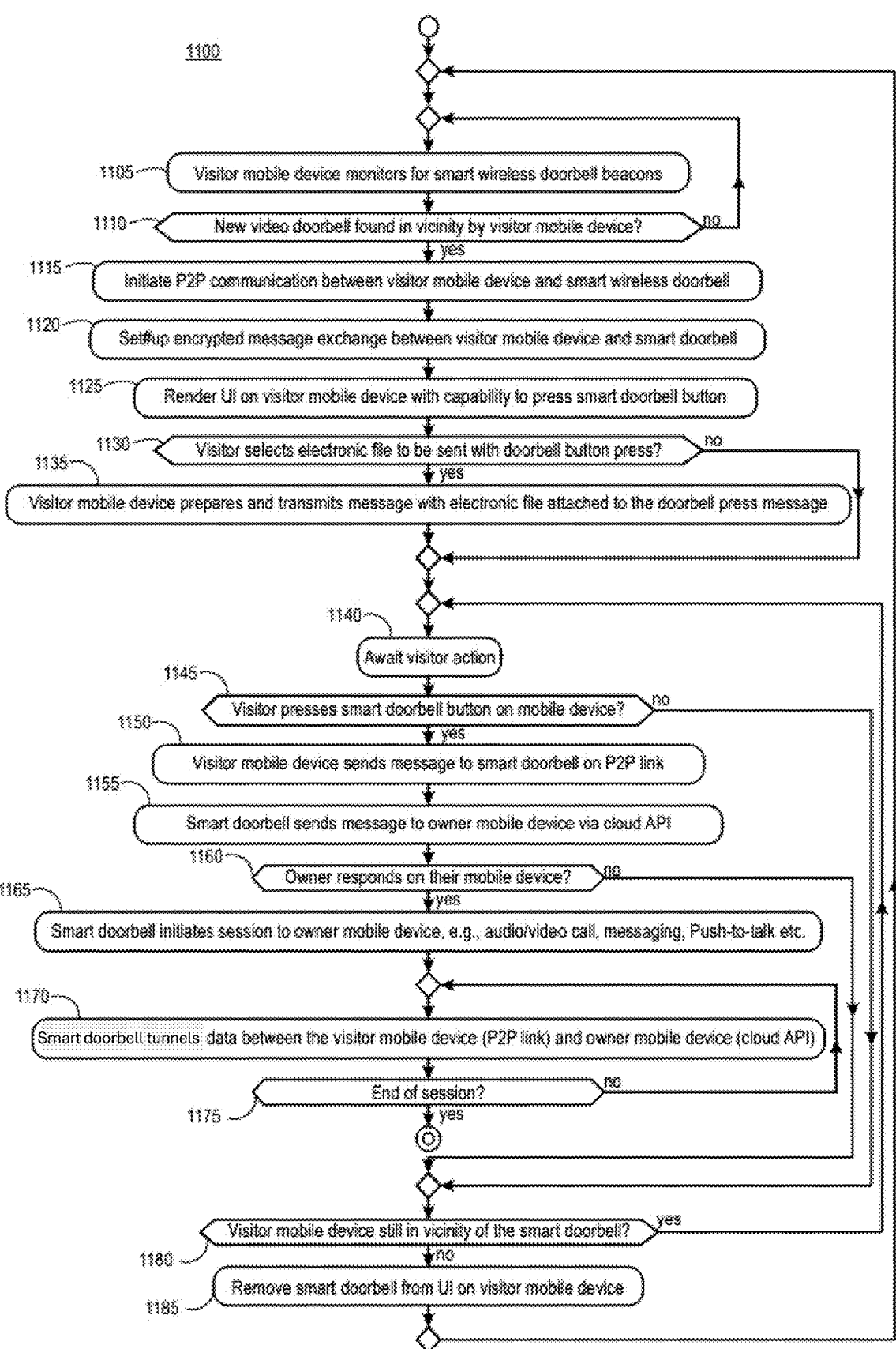

1100

1105 — Visitor mobile device monitors for smart wireless doorbell beacons

1110 — New video doorbell found in vicinity by visitor mobile device? — no yes

1115 — Initiate P2P communication between visitor mobile device and smart wireless doorbell 1120 — Set-up encrypted message exchange between visitor mobile device and smart doorbell 1125 — Render UI on visitor mobile device with capability to press smart doorbell button 1130 — Visitor selects electronic file to be sent with doorbell button press? — no 1135 — yes Visitor mobile device prepares and transmits message with electronic file attached to the doorbell press message 1140 — Await visitor action 1145 — Visitor presses smart doorbell button on mobile device? — no 1150 — yes Visitor mobile device sends message to smart doorbell on P2P link 1155 — Smart doorbell sends message to owner mobile device via cloud API 1160 — Owner responds on their mobile device? — no yes 1165 — Smart doorbell initiates session to owner mobile device, e.g., audio/video call, messaging, Push-to-talk etc.

1170 — Smart doorbell tunnels data between the visitor mobile device (P2P link) and owner mobile device (cloud API)

End of session? — no

1175 — yes

1180 — Visitor mobile device still in vicinity of the smart doorbell? — yes no

1185 — Remove smart doorbell from UI on visitor mobile device

FIG. 11

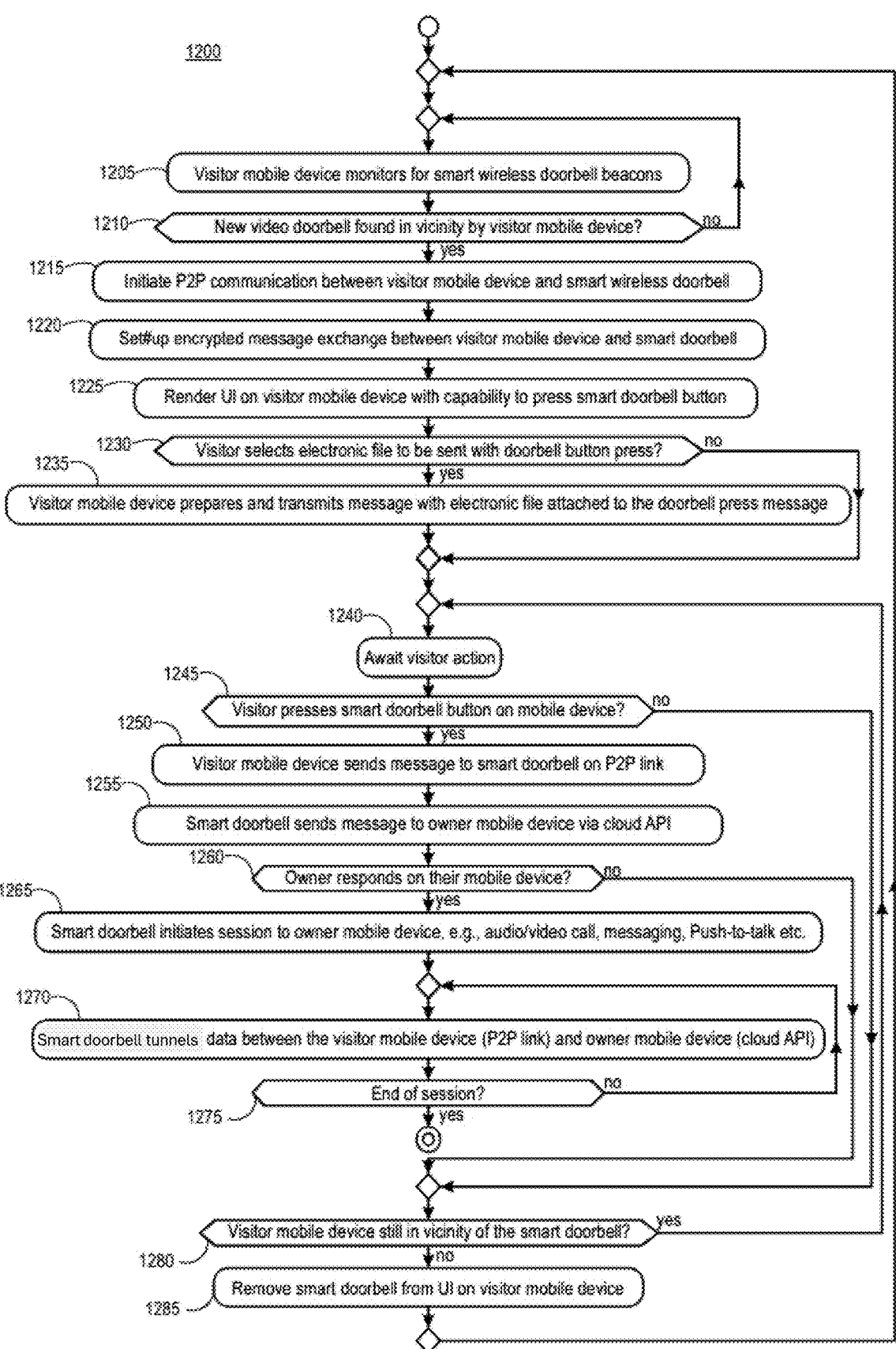

1200

1205 — Visitor mobile device monitors for smart wireless doorbell beacons

1210 — New video doorbell found in vicinity by visitor mobile device? — no yes

1215 — Initiate P2P communication between visitor mobile device and smart wireless doorbell 1220 — Set#up encrypted message exchange between visitor mobile device and smart doorbell 1225 — Render UI on visitor mobile device with capability to press smart doorbell button 1230 — Visitor selects electronic file to be sent with doorbell button press? — no 1235 — yes Visitor mobile device prepares and transmits message with electronic file attached to the doorbell press message 1240 — Await visitor action 1245 — Visitor presses smart doorbell button on mobile device? — no yes 1250 — Visitor mobile device sends message to smart doorbell on P2P link 1255 — Smart doorbell sends message to owner mobile device via cloud API 1260 — Owner responds on their mobile device? — no yes 1265 — Smart doorbell initiates session to owner mobile device, e.g., audio/video call, messaging, Push-to-talk etc.

1270 — Smart doorbell tunnels data between the visitor mobile device (P2P link) and owner mobile device (cloud API)

End of session? — no

1275 — yes

Visitor mobile device still in vicinity of the smart doorbell? — yes

1280 — no

1285 — Remove smart doorbell from UI on visitor mobile device

FIG. 12

SYSTEMS AND METHODS FOR ENHANCED VIDEO DOORBELL EXPERIENCES

FIELD OF DISCLOSURE

Embodiments of the present disclosure relate to providing wireless communications and various types of engagement between a smart/video doorbell and a visitor's mobile device based on the visitor mobile device meeting certain criteria. Embodiments of the present disclosure also relate to establishing peer-to-peer communications with smart doorbells/intercoms subscribed to a neighborhood watch for monitoring and reporting activity detected by any of the subscribed smart doorbells.

BACKGROUND

Video doorbells have become common in current times. Research published in September 2023 by Parks Associates reveals that 20% of U.S. households that have Internet now have a video doorbell, a figure that has risen precipitously in recent years. (Comeau, Zachary. "Adoption of Video Doorbells Reaches to 20% of US Internet Households in 2023." Park Associates, Sep. 26, 2023, www.Parkassociates.com on). Homeowners or residents may use these video doorbells to communicate with a visitor who is standing outside their door via a camera and microphone of the video doorbell. Homeowners or residents may also use these video doorbells as a security camera to see who is at their door or if someone is stealing a package left at their door.

Although the current video doorbells serve as a valuable communication and security tool, they are limited in their offerings. For example, a visitor wanting to ring the video doorbell or speak to the resident/owner of the house would need to walk up to the house and physically press the video doorbell. If the resident of the house is not there, or does not answer the doorbell, it may be a cumbersome exercise to walk all the way up to the doorbell that could have been avoided.

In another example, the visitor may want to simply send some supplemental information, such as an electronic file that may contain their contact information, flyer, or other type of material to the resident of the house. Some of the information that the visitor intends to send may be important to the resident in terms of deciding whether they should open the door or interact remotely with the visitor using audio/video features of the doorbell. Since the current state of technology in the doorbells does not provide any means for sending such an electronic file, the resident may be unaware of who is at the door or what is the purpose of the visit by the visitor and may either not open the door at all or open the door and then regret that they spent time with a solicitor selling a product that is not of interest to the resident.

In another example, the visitor may be picking up someone in the house where the video doorbell is located. As such, the purpose of ringing the doorbell may be to simply inform the resident that they have arrived. To do so, especially when the weather is bad, the visitor may still have to go through the cumbersome exercise of getting out of their car and walking up to the doorbell simply to ring it and then going back and sitting in their car.

In yet another example, an e-commerce delivery driver, such as an Amazon™ driver, or an e-commerce tracking system, may want to inform the homeowner that their package is arriving, or has been dropped at their door or at another location around the house. To do so using the current doorbell/intercom, the driver would have to walk up to the homeowner's door and press the physical doorbell to inform them. The Amazon system may also send notification on the homeowner's Amazon App; however, the homeowner may not be checking their Amazon App routinely for the notification. In some instances, the Amazon driver, or other postal services (e.g., FedEx, UPS, etc.) may need the homeowner's signature for delivering the package. In such instances, the driver would have to walk up to the homeowner's door and press the physical doorbell and wait till the homeowner arrives. If the homeowner is not available, the package may need to be returned to sender causing delay in the homeowner receiving the package.

Another limitation of the current doorbells relates to solicitors and advertisers. When a solicitor or advertiser walks up to the door and rings the doorbell, the resident of the home may not want to answer the door. But they may still hear the ringing of the doorbell over a speaker in the house. Such unwanted ringing may be an annoyance that they may not be able to avoid, based on the current design and working of the video doorbell.

As such, there is a need for a system and method for providing communications and various engagement opportunities between the video doorbell and the visitor with or without the visitor having to physically approach the video doorbell, depending on the resident/homeowner's configuration of the video doorbell.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale. Various objects and advantages of the disclosure will be apparent upon consideration of the following detailed description, taken in conjunction with the accompanying drawings, in which like reference characters refer to like parts throughout, and in which:

FIG. 2 is a block diagram of a process for establishing a neighborhood watch using a plurality of smart doorbells that are communicatively connected to each other, in accordance with some embodiments of the disclosure;

FIG. 8 is an example of types of communications allowed based on the type of attributes of a visitor mobile device and context of the visit, in accordance with some embodiments of the disclosure;

FIG. 11 is a flowchart of a process for establishing a peer-to-peer link between the smart doorbell and the visitor mobile device, in accordance with some embodiments of the disclosure;

FIG. 12 is a flowchart of a process of communication between the visitor mobile device and a cloud server, in accordance with some embodiments of the disclosure;

DETAILED DESCRIPTION

Figure 1:
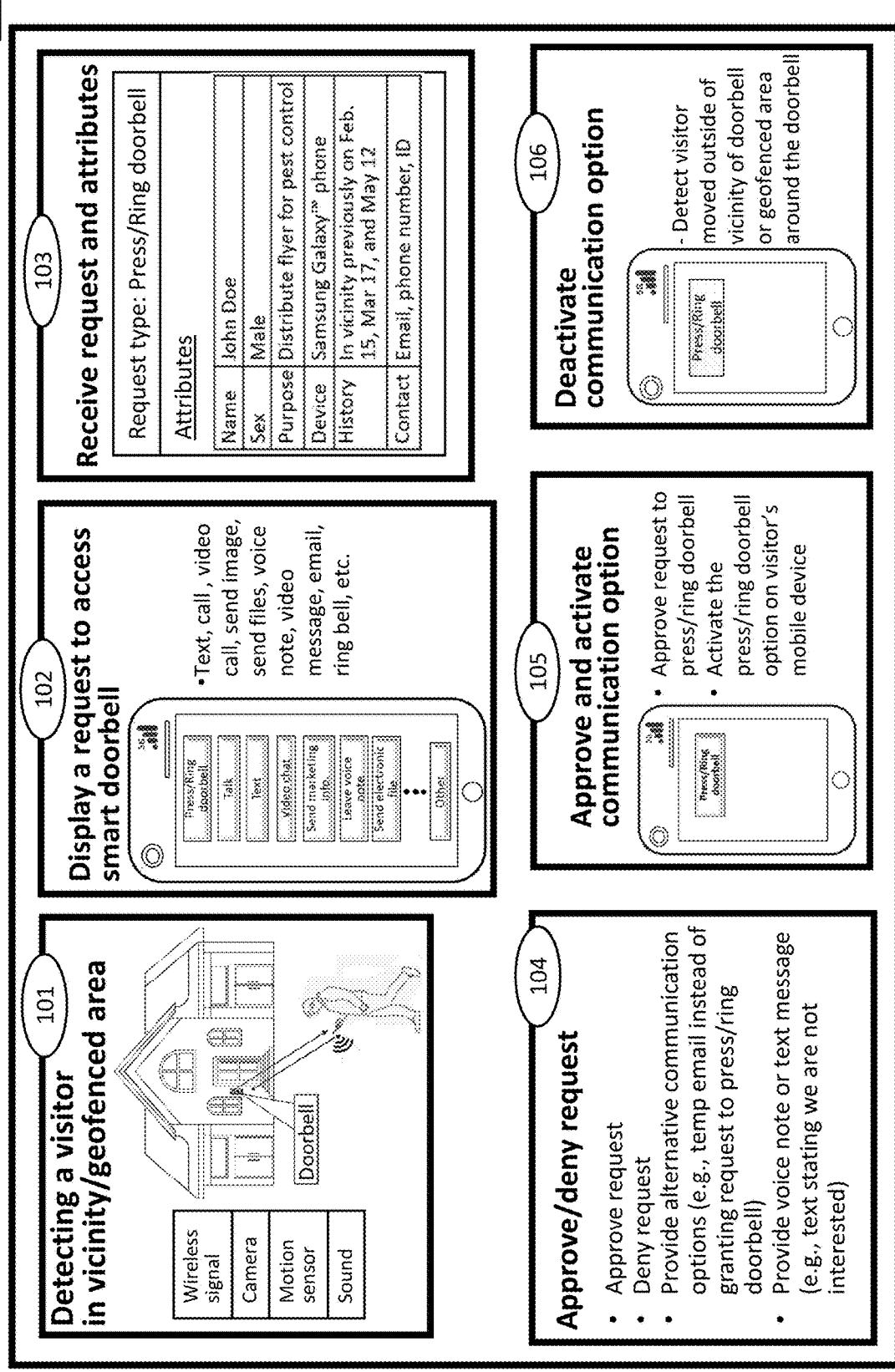
FIG. 1 is a block diagram of a process for establishing communications between a smart doorbell and a visitor mobile device based on the visitor mobile device satisfying a set of predetermined criteria, in accordance with some embodiments of the disclosure.

In accordance with some embodiments disclosed herein, some of the above-mentioned limitations are overcome by allowing a visitor to press or ring a video doorbell virtually (also referred to as a smart doorbell, wireless smart doorbell, intercom, or smart/wireless intercom) from their mobile device rather than physically approaching the door. The visitor who intends to press, ring, or communicate via the smart doorbell must be within a short distance of the house with the smart doorbell, e.g., within a geo-fenced area surrounding the smart doorbell where the visitor's mobile signal can be detected by the smart doorbell. In one embodiment, enabling communications options on the visitor's mobile device may involve determining the visitor's identity, purpose of visit, and other attributes and characteristics. Such information may be received by the doorbell via an electronic file sent by the visitor mobile device. The received information, attributes and characteristics may then be evaluated to determine whether they satisfy certain criteria that are configured for the smart doorbell. If the criteria are satisfied, then various communication options may be enabled on the visitor mobile device that allow the visitor to communicate with the smart doorbell or with a host, such as a homeowner/resident who resides at the house with the smart doorbell. The homeowner/resident may also be communicatively connected to the smart doorbell. In another embodiment, enabling communications options on the visitor's mobile device may involve determining whether the visitor mobile device is within a geofence created around the smart doorbell. This geofence may be enforced using the location of the visitor mobile device relative to the (stationary) location of the smart doorbell. The visitor mobile device's location may be determined using any of the localization technologies, such as GPS, GNSS etc. If the visitor mobile device is found to be inside the geofence, then various communication options may be enabled on the visitor mobile device.

As described herein, a visitor mobile device (or a visitor's mobile device) is a device that has not been in/accepted to the home Wi-Fi network where the smart doorbell is located. It may also be a device that has not exchanged traffic for a predetermined amount of time with the home Wi-Fi network. Accordingly, a device which belongs to a member of the household where the smart doorbell is located and is accepted by the home Wi-Fi network would not be considered to be a visitor mobile device.

In accordance with other embodiments disclosed herein, some of the above-mentioned limitations are also overcome by having a server establish a neighborhood watch that comprises a plurality of communicatively connected smart doorbells that are located within a confined area, such as within a neighborhood, that are subscribed to the neighborhood watch. In this embodiment, the smart doorbells subscribed to the neighborhood watch may monitor for activities in the neighborhood, such as a break-in or other suspicious activity, and upon detecting the occurrence of a suspicious activity (e.g., the activity meeting a predetermined threshold), directly or via the server, alert all the smart doorbells, and/or alter all user devices, such as mobile phones, associated with those smart doorbells, that are subscribed to the neighborhood watch.

In some embodiments, the alert transmitted (e.g., payload of the alert) as part of the neighborhood watch program, may include a video, or a link to the video, such as a video that shows the suspicious activity. The link may be to a live stream in-real time and/or to a portion of the event (e.g., portion at which the suspicious activity occurred). The smart doorbell that obtains the video may also set parameters of what to share, such as it may disable the sharing of the live stream manually (e.g., when the police arrive). Information that is included in the alert may include nature of the suspicious activity, link to the video, and other details related to the suspicious activity, such as how far the house or the smart doorbell that reported the suspicious activity is from each house that receives the alert. The alert may also include the name or surname of the resident of the home associated with the smart doorbell that captured the suspicious activity or that triggered the alert. It may also include the name of the street or address. For example, the alert may state that: "A house that is 0.7 miles away from you might be experiencing a distress." If the category of such distress is known (e.g., break-in), then "break-in" may be included in the alert. Distress may also include any distress internal to the house, such as a medical emergency monitored by cameras or IoT devices connected to the smart doorbell, which may be reported to neighbors as an alert to help. The communications between the smart doorbells may be via the server, peer-to-peer communication, or short range radio frequency (RF) protocol such as Bluetooth, UWB, etc.

With respect to the embodiments relating to allowing a visitor to press the smart doorbell from their mobile device, in one embodiment, a visitor may be in the vicinity of a smart doorbell or within an established geofence. A geofence may be established along a perimeter around the smart doorbell. If a visitor mobile device is within the established geofence, such as in FIG. 6 and FIG. 7 (geofence not shown), then the visitor mobile device may be able to query the smart doorbell, or a server associated with the smart doorbell, for smart doorbells in the vicinity of the visitor mobile device. In some embodiments, the smart doorbells may emit a radio frequency (RF) from a beacon that can be detected by the visitor mobile devices that are within the geofence. The broadcast message from a beacon emitted by the smart doorbell may include public information, such as the home address associated with the smart doorbell. Optionally, the resident of the home where the smart doorbell is located may also advertise their name and any other information such as notes for visitors approaching the door (e.g., "Beware of dog," "Leave package in designated marked area," etc.). In some embodiments, the beacon emitted from the smart doorbell may itself be received at the visitor mobile device using an operating system (OS) utility such as Airdrop™ (iOS™) or Nearby Share (Android™). In such embodiments, there may not be a need for a purpose-built application to contact the smart doorbell or the resident of the home where the smart doorbell is located. Activation of such a smart doorbell, without the purpose-built application, may include transmitting an electronic file, such as a media file, from the smart doorbell to the visitor mobile device, which may be received using a utility such Airdrop or Nearby Share. The visitor mobile device may accept the received electronic/media file and communicate with the smart doorbell.

In another embodiment, the RF beacon emitted by the visitor mobile device may be detected by the smart doorbell if the visitor mobile device is within the geofence. The beacon from the visitor mobile device may also include public information, such as name of the user associated with the visitor mobile device, their company name, if they are representing a company for distributing advertising material, and any other information that the visitor mobile device wants to advertise to the smart doorbell. As will be described in further detail below, one of the goals of the geofence may be to ensure that those visitors who are within a proximate distance of the house with the smart doorbell are provided access to the smart doorbell only if they satisfy preset criteria. In other words, a user of a mobile phone who is within a proximate distance of the doorbell is more likely to be a visitor to the house with the doorbell than another user who is farther away from the house (who may be a visitor to another house or just a passerby).

In some embodiments, when a visitor mobile device is within the established vicinity or geofence, a cloud API may allow the visitor mobile device to query the smart doorbell. Whether the visitor is within the vicinity or geofence may be established based on the GPS/location coordinates of the visitor mobile device, or it may be established through P2P communication, e.g., discovery by smart doorbells of radio frequency (RF) beacons emitted by mobile devices in the proximity. For example, a geofence may be a predetermined distance from the smart doorbell. The geofence may also be established based on strength of a wireless signal, e.g., as long as a predetermined wireless signal strength is detected, devices that emit or receive such wireless signals may be considered to be within the geofence. The visitor mobile device, after receiving the beacon or determining via alternate means that it is within the smart doorbell's geofence, may send a query to the smart doorbell. The smart doorbell receiving the query, or a request to communicate, may determine whether the visitor mobile device satisfies a predetermined set of criteria before accepting the request to communicate. To do so, attributes and characteristics of the visitor, the visitor mobile device, or other data, such as images or video of the visitor captured by a camera of the smart doorbell (which may be captured if the visitor mobile device is within a field of view of the camera), may be evaluated against the predetermined set of criteria. The smart doorbell may either receive such attributes along with the request or may request them from the visitor mobile device if not received with the request.

In yet other embodiments, methods using QR codes may also be used to allow communication between a visitor mobile device and a smart doorbell. For example, a visitor using a visitor mobile device may request to contact the smart doorbell or a resident/owner of a house on the app while standing outside their door. The smart doorbell platform may receive the request and provide a QR code to the visitor mobile device. The visitor mobile device may then use its camera to capture and send (or locally read) this QR code. Once it is verified that the QR code is valid, i.e., was sent by the smart doorbell platform, then the location of the user mobile device may be established and associated with the smart doorbell to then allow communication between the visitor mobile device and the smart doorbell.

In some embodiments, the smart doorbell may itself evaluate the attributes obtained from the visitor mobile device against the predetermined set of criteria. For example, it may compare the attributes and other information to a restricted list and on its basis approve or deny a request to communicate. In other embodiments, attribute data relating to a visitor mobile device may be provided by the smart doorbell to a server associated with the smart doorbell for evaluation. The predetermined set of criteria may be any criteria that are established by a resident of the house or structure where the smart doorbell is located. The predetermined set of criteria may also be automatically established by the smart doorbell, a server associated with the smart doorbell, or a third party servicing the smart doorbell, such as based on recommendations from an artificial intelligence engine or a machine learning engine. The predetermined set of criteria may also be based on recommendations from a neighborhood committee or association where certain types of visitors, such as solicitors or advertisers, are not allowed.

In some embodiments, the predetermined set of criteria may describe which types of visitors are allowed and which are not. For example, the resident of the house may prefer not to allow solicitors, advertisers, etc., and may allow only visitors who are residents of their neighborhood, visitors who are on their contact list, or are known or anticipated visitors, such as a visitor who is a pizza delivery person that is known because the smart doorbell is provided information from the resident's mobile devices that an order for a pizza was placed and the delivery person is to be expected. Such configurations, such as those relating to solicitors and advertiser, may be permanently enabled, or set temporally (for a period of time) by the resident/homeowner or another entity with authorization.

Each criterion, from the predetermined set of criteria, may be associated with a different type of communication that is allowed between the visitor mobile device and the smart doorbell. For example, the predetermined set of criteria may be configured such that if the visitor is determined to be an advertiser who wishes to provide advertising material to the house resident, then the smart doorbell, server or system associated with the smart doorbell may provide a temporary device address such as a fake phone number or email ID to the visitor mobile device. This temporary device address may be assigned by the smart doorbell platform to hide the house resident's identity, while also allowing the visitor to send the advertising material. The temporary or fake phone number may allow, depending on the configuration options chosen by the resident of the house where the smart doorbell is located, the visitor mobile device the ability to call or text the smart doorbell. The assigned temporary phone number/ email, etc., may be time-sensitive, allowing the smart doorbell, or the resident of the house, to be reached for a very limited time period, for example for three minutes.

Figure 7:
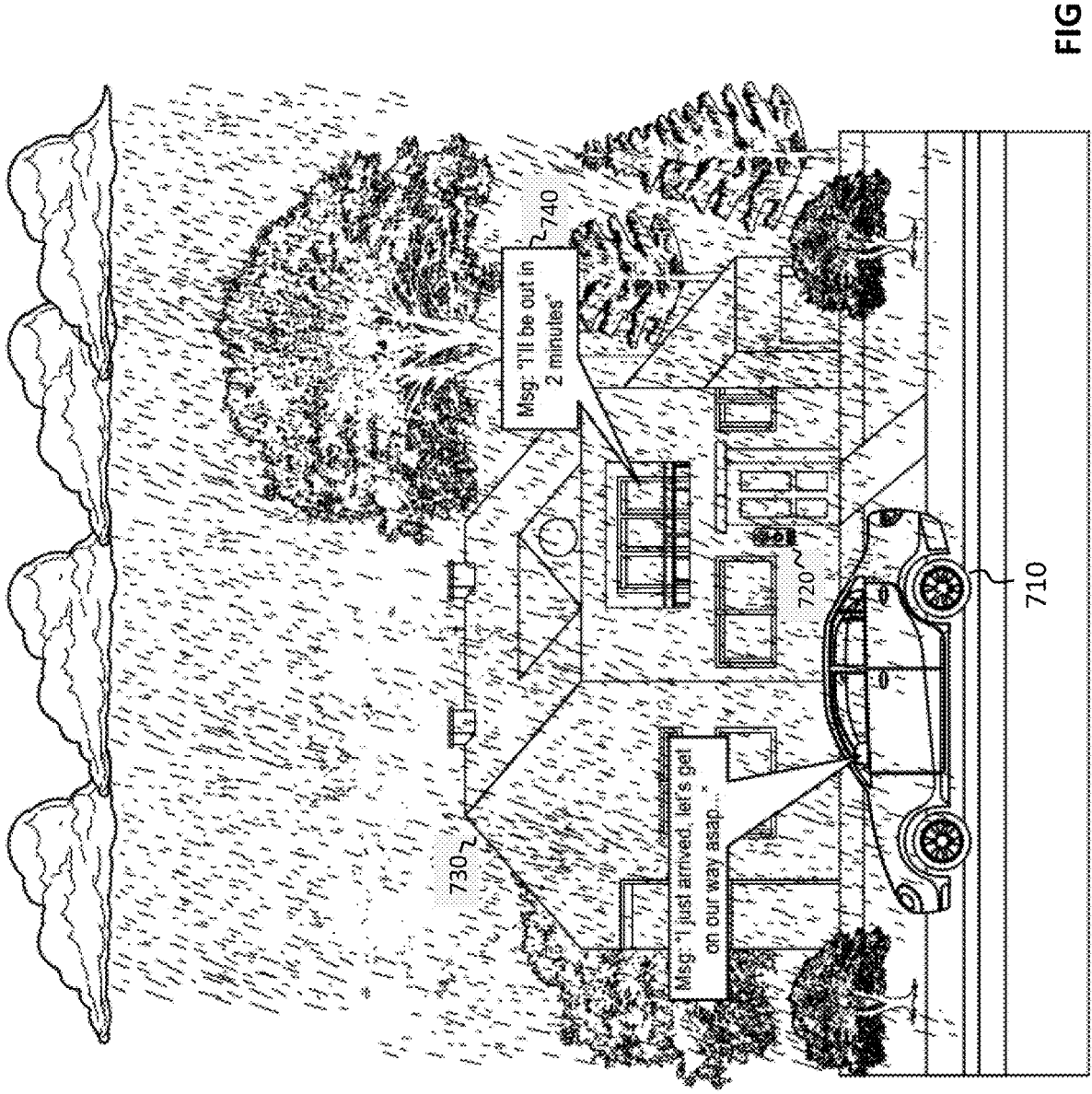
FIG. 7 is another diagram of a visitor mobile device communicating with a resident of a home where a smart doorbell is located, in accordance with some embodiments of the disclosure.

In another example, the predetermined set of criteria may be configured such that if the visitor is someone who is saved in the contact list associated with the smart doorbell or the contact list associated with a mobile device (also referred to as the host device) of the house resident associated with the smart doorbell, then the smart doorbell, server or system associated with the smart doorbell may provide a "ring doorbell," "text," "call," "video chat," "send image," "send video," or send "electronic file" option as a communication option to the visitor mobile device since the visitor is an entity known and trusted by the house resident. In this use case, where the visitor is a known entity or in the contact list of the host/mobile device associated with the resident of the house, the advantage provided to the visitor may be the ability to communicate, such as via ringing the smart doorbell, without the visitor having to step out of a vehicle and approach a home in an extreme climate (as depicted in FIG. 7), especially when the resident of the house intends to step out and join the other person. In this use case, the smart doorbell may make available, on the visitor mobile device, all the options to communicate with the doorbell and the resident of the house, Including the "ring doorbell" option. This may also create an opportunity for smart doorbell vendors by shifting such conversations to their platforms, thus providing a value-added features and advertising. For example, if the context of the communication between the visitor and the smart doorbell is determined to be the visitor picking up the resident of the house in their automobile for dinner or a movie, then recommendations for restaurants or movies, including promotions and offers, may also be provided via the platform.

In some embodiments, once the predetermined set of criteria is satisfied, the system or server associated with the smart doorbell may establish peer to peer (P2P) communication between the smart doorbell and the visitor mobile device. This may allow the visitor mobile device to communicate with the smart doorbell, or an electronic device of the resident of the home that is connected to the smart doorbell.

The communication may be established by first exchanging public keys, and subsequently exchanging a symmetric key (typically generated by the mobile device) using asymmetric key encryption. Such exchange of public and symmetric keys may allow both the smart doorbell and the visitor mobile device to communicate with each other using a secure encrypted communication link. The type of communication may depend on which criteria, from the set of predetermined criteria, are satisfied. Accordingly, the system or server may cause to display, on a user interface of the visitor mobile device, an icon, button, or some other selectable feature that is associated with the type of communication allowed corresponding to the criteria satisfied. For example, the icon, button, or some other selectable feature displayed on the visitor mobile device may be a "press/ring smart doorbell" option, or a "text," "video chat," or "leave voice message," "send image," "send video," or send "electronic file" option. In other embodiments, communication between the smart doorbell and visitor mobile device is established by a cloud server. In this embodiment the cloud server may establish a secure channel with the visitor mobile device on the one side, and a smart doorbell on the other side.

In some embodiments, a selection of the icon, button, or some other selectable feature displayed on the visitor mobile device may be received by the smart doorbell or a server or system associated with the smart doorbell. The system may execute the selection and allow communication between the smart doorbell and the visitor mobile device or between visitor mobile device and the host/resident of the house's mobile/host device either directly, such as by using a cloud server to access the host mobile device, or via the smart doorbell, such as via P2P RF communication followed by cloud server to access host mobile device.

In some embodiments, the system, the server, or the communication platform that uses API to connect to the smart doorbell may continue to obtain location data, such as GPS coordinates, of the visitor mobile device periodically. The location data may be used to monitor and track the visitor mobile device as it moves from one location to another. If a determination is made, based on the location data, that the visitor mobile device has moved away from the smart doorbell, then the established communication may be deactivated. If the system determines that the visitor mobile device has moved more than a predetermined distance away from the smart doorbell or has moved outside the geofence area that was set up around the smart doorbell, it may then deactivate the previously established communication.

With respect to the embodiments relating to establishing a neighborhood watch, monitoring activity in the neighborhood, and reporting such activity by alerting other smart doorbells that are subscribed to the neighborhood watch program, in some embodiments, a server may transmit a join request to a plurality of smart doorbells that are in the same neighborhood. The server may transmit the request to only those smart doorbells that are on a same street, within a predetermined distance of a selected smart doorbell, in a same community or neighborhood, or within a predetermined latency (indicative of distance on a network) from the server (e.g., within 20 milliseconds of where the server is located). The server may also use P2P communication, such as discovery of RF beacons emitted by smart (wireless) doorbells, to determine which smart doorbells to invite to join a neighborhood watch. In yet more embodiments, in an initial setup phase, the server may prompt a plurality of smart doorbells to join one or more neighborhood watches. The smart doorbells may also join a neighborhood watch at any time after the initial set-up phase. Users associated with smart doorbells may also sign up for alerts in their neighborhood and other neighborhoods. For example, parents might follow multiple neighborhood watches, such as a neighborhood watch where they live, a neighborhood watch where their children go to school, and/or any neighborhood watch that is associated with activities relating to their children.

Some or all of the smart doorbells to which a join request has been transmitted may select the option to join the neighborhood watch program. Once the server receives the acceptance of a join request, the server may associate all the smart doorbells that joined or subscribed to the neighborhood watch program in a group. This group of smart doorbells in the neighborhood watch program may be able to communicate with each other in a P2P format or communicate with each other via the server.

In some embodiments, a smart doorbell, such as a first smart doorbell from the plurality of doorbells that are subscribed to the neighborhood watch program, may detect an activity. The activity may be detected based on a camera associated with the smart doorbell or based on receiving a mobile signal from a visitor mobile device. The smart doorbell may report the activity to the server for further analysis. If a determination is made that the activity relates to a suspicious activity, then the server may alert all the smart doorbells subscribed to the neighborhood watch program. In some embodiments, an activity may be determined to be suspicious if it relates to a break-in, burglary, or robbery, or relates to an activity that involves an automobile that is registered as stolen, registered to a sex offender, registered to a user with a criminal record, or is subject of an Amber Alert. The activity may also be determined to be suspicious if it relates to detecting an unidentified person lurking on/around the property for a prolonged period of time, such as a trespasser or someone staking out. The system, the smart doorbell, the resident of the house of the smart doorbell, or the neighborhood committee or watch program may also list criteria of what is considered an activity suspicious enough to alert all the smart doorbells in the neighborhood watch program and even authorities, such as the police department. The criteria for a suspicious activity may be designed such that the system does not alert all the smart doorbells simply because a pizza delivery is made to one of the houses in the neighborhood and the pizza delivery person is not recognized, which is different from trespassing. Artificial intelligence algorithms may be used to distinguish between such common activity and suspicious activity. In some embodiments, the smart doorbells may be a part of a larger system of multiple cameras, such as surveillance or home monitoring camera, which can detect trespassing, such as entering a backyard etc. Such larger systems may also be used to detect if a suspicious activity is taking place around the property (even if not directly in front of the smart doorbell). Such detection, if found suspicious, may also be subject of a neighborhood alert to inform all the smart doorbells that are joined into a neighborhood watch, as described further in relation to FIG. 2.

Referring to the figures, FIG. 1 is a block diagram of a process 100 for establishing communications between a smart doorbell and a visitor mobile device based on the visitor mobile device satisfying a set of predetermined criteria, in accordance with some embodiments of the disclosure. The process 100 may be implemented, in whole or in part, by systems or devices such as those shown in FIGS. 3-4. One or more actions of the process 100 may be incorporated into or combined with one or more actions of any other process or embodiments described herein. The process 100 may be saved to a memory or storage (e.g., any one of those depicted in FIGS. 3-4) as one or more instructions or routines that may be executed by a corresponding device or system to implement the process 100.

At block 101, a smart doorbell is detected by a visitor mobile device. In some embodiments, the smart doorbell, also referred to as video doorbell or video intercom, may be a physical device, such as device 400 depicted in FIG. 4 or device 500 depicted in FIG. 5. The smart doorbell may be attached to a house 630 of FIG. 6, such as near its main door, or to another type of structure. The doorbell may include a video camera 510 of FIG. 5, microphone/speaker 530, Wi-Fi or other communication capability 540, motion sensor, night vision, and a physical press button 520. The camera 510 of the smart doorbell may have a field of view that may capture the area surrounding the front door of a house or structure as well as other surrounding areas such as the front of the house, street in front of the house, driveway, and other areas. The smart doorbell may also extend its reach if it is part of a larger system of camera, such as home monitoring camera situated in a backyard of the house. Camera feeds from such larger system may be received and analyzed by the smart doorbell.

In other embodiments, a button for ringing the smart doorbell may be located outside the house, however, electronics may be located elsewhere, such as inside the house or embedded in another device, such as a home assistant, answering machine, etc.

The visitor device may be a mobile device, such as a smart phone, tablet, smart watch, laptop, automobile navigation system, or infotainment system. It may also be an unpiloted drone that has communication capability. The visitor device (also referred to as visitor mobile device) may be a wireless device that is capable of connecting to the internet or has other means of communicating wirelessly, such as via cellular, Wi-Fi, Li-Fi, acoustic, Bluetooth, or by using another type of near field communications (NFC) system. The visitor mobile device may also include applications capable of making API calls that may allow it to connect wirelessly to the doorbell, a server, or a cloud server. The visitor mobile device may also have capability to transmit and receive radio frequency (RF) beacons.

In some embodiments, the smart doorbell may implement a geofence. The geofence may also be implemented by a server associated with the smart doorbell, a third party that manages or services the smart doorbell, a resident of the home that includes the smart doorbell, etc. The geofence may have a defined area that is a predetermined distance from the location of the smart doorbell, such as five meters, 10 meters, etc. The geofence may also be defined based on signal strength. For example, the geofence may allow signals that are −30 dBm or higher and not allow signals having signal strength below −30 dBm. In this scenario, where the geofence is based on signal strength, to determine whether a visitor mobile device is inside or outside the geofence area, the visitor mobile device may measure the signal strength of a wireless signal (RF beacon) from the smart doorbell or the system, such as system of FIG. 3, may measure the signal strength of a wireless signal received from a visitor mobile device to determine whether it is inside or outside the geofence area. The geofence area may be defined with respect to distance, signal, or other criteria from the smart doorbell. It may also be defined with respect to distance, signal, or other criteria from the a system associated with the smart doorbell. Although some techniques of establishing the boundaries of a geofence have been described, the embodiments are not so limited, and other techniques and measuring methods may also be used to establish a geofence boundary.

In some embodiments, geofencing may implemented via a cloud API around a smart doorbell that lets a visitor mobile device query a server for smart wireless doorbells in its vicinity based on its GPS/location coordinates. Likewise, in other embodiments, geofencing may be implemented via a cloud API that lets a smart doorbell query a server for mobile devices that are within a vicinity of the smart doorbell or inside the geofence area created. Geo-fencing may be location based, i.e., to create a boundary based on location and coordinates. To determine whether a visitor mobile device is within the geofence, RF beaconing technique may be used. For example, an RF beacon may be transmitted by the smart doorbell at a controlled power, so that only mobile devices in the vicinity may receive it, thus enforcing the geofence. Alternatively, the mobile device may receive the RF beacon and also check received power. If the received power is above a threshold, then the mobile device is within the geofence of the smart doorbell.

Figure 6:
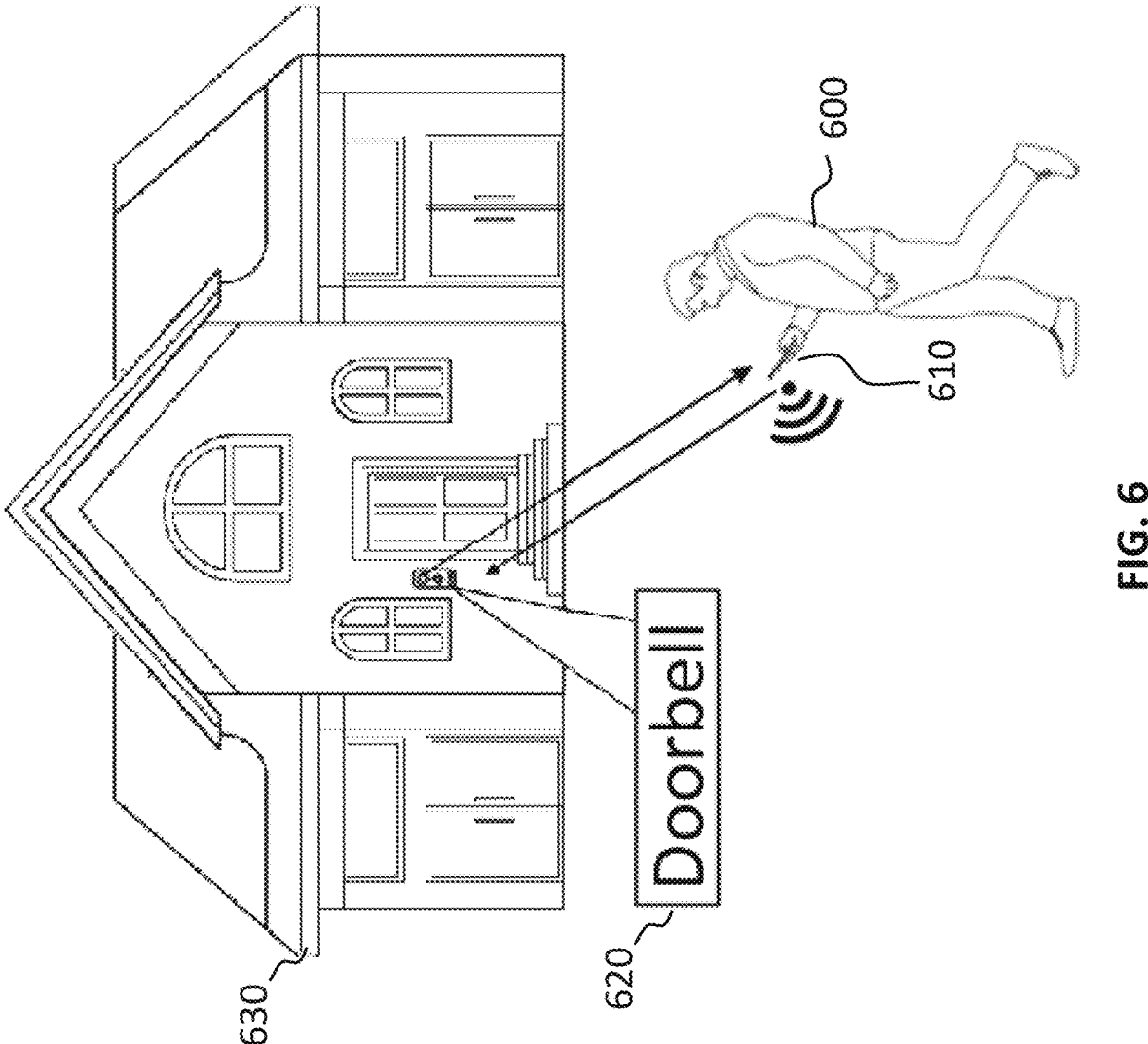
FIG. 6 is a diagram of a visitor mobile device communicating with a smart doorbell, in accordance with some embodiments of the disclosure.

In some embodiments, the resident of a house or structure where the smart doorbell is located, or the owner of the smart video doorbell, may configure the geofence using a user interface (UI) that may be provided by the smart doorbell platform provider or a third-party integrator (e.g., drawing a circle or irregular shape around the house on a map, setting a distance/radius for a beacon, etc.). Using the UI associated with the smart doorbell platform, the resident of a house or structure where the smart doorbell is located may configure a distance or perimeter for advertising the doorbell (e.g., making it visible on other devices), such as five meters, 10 meters, within a certain signal strength of a visitor mobile device, etc. Using the UI associated with the smart doorbell platform, the resident of a house or structure where the smart doorbell is located may also open a map and graphically circle the area around which the geofence boundary is to be located, such as via a touchscreen feature of the UI. Such an ability to configure based on distance or signal strength may allow the resident of a house or structure where the smart doorbell is located, or owner of the smart doorbell, greater control. It also greatly limits to whom and when to allow communication between the smart doorbell and another mobile device, such as the mobile device of a visitor. It may also provide the resident of a house or structure where the smart doorbell is located, or owner of the smart doorbell, the ability to prevent abuse of the smart doorbell feature. For example, since one of the goals of the smart doorbell is to allow a visitor to press/ring the doorbell virtually without having to walk up all the way to the door, especially in bad weather as depicted in FIG. 6, the geofence may be created to allow to communicate with the doorbell only individuals who actually intend to communicate with the doorbell and not just any passerby or someone who is visiting a neighbor's house. To do so, the geofence may be created around the smart doorbell with a shorter boundary.

Figure 9:
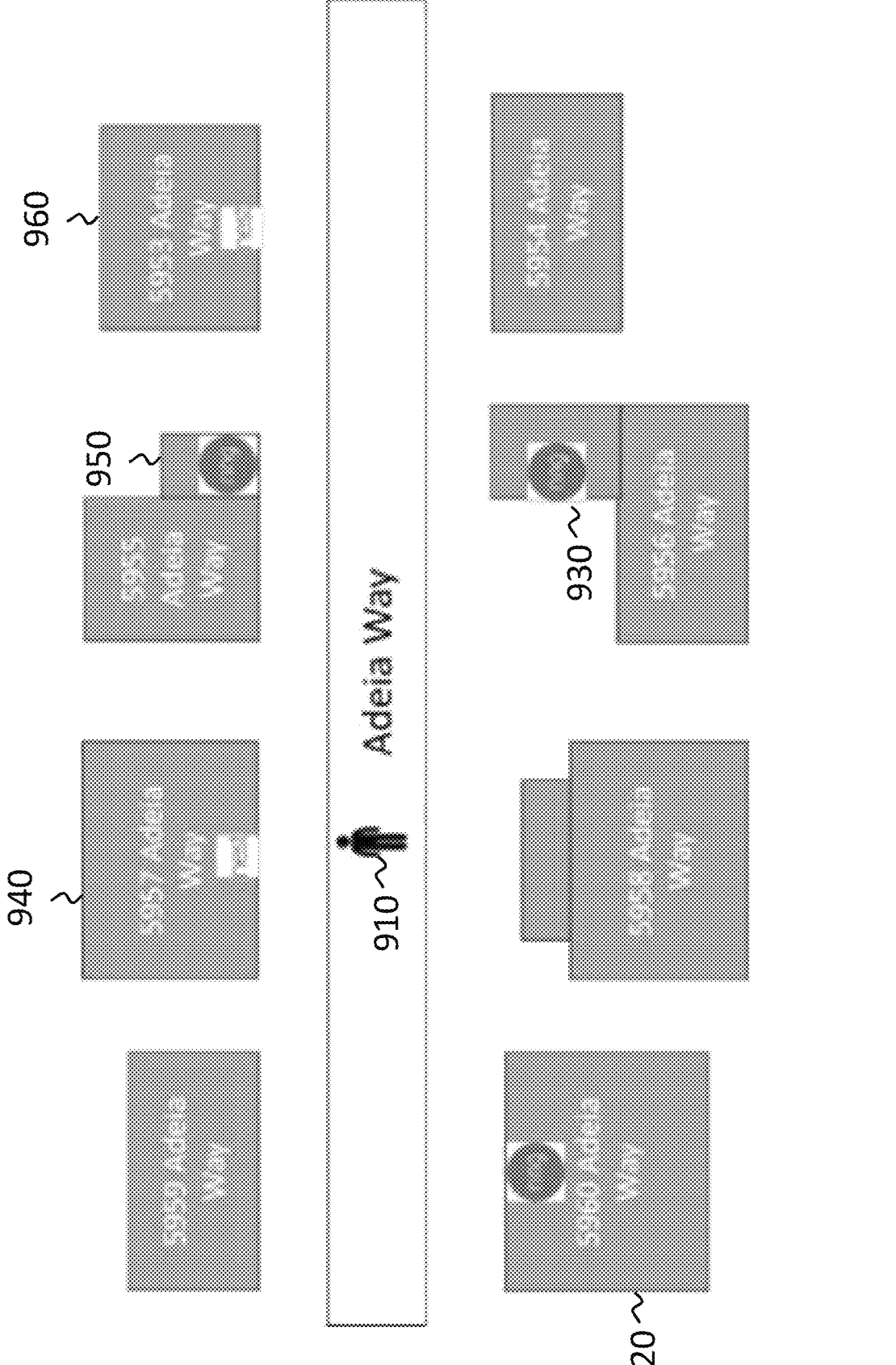
FIG. 9 is a block diagram of an example of a user interface rendering a map when location-based geofencing is available, in accordance with some embodiments of the disclosure.

In other embodiments, the geofence may be created based on a geographical map, such as in FIG. 9. In such embodiments, coordinates of the map may be used to create a boundary of the geofence. If a map is not available, the address of the location of the smart doorbell and the visitor mobile device may be determined based on their emitted RF beacons. The smart doorbell, or the system associated with the smart doorbell, may via cloud API from the platform provider, advertise public information, such as the home address associated with the smart doorbell. An angle of arrival of the beacon emitted by the smart doorbell and received at the visitor mobile device may be calculated to determine relative orientation and direction of the smart doorbell with respect to the visitor mobile device. Such location and orientation data may be used to establish the geofence boundary. Additional details relating to such beacons and angle of arrival techniques are described in relation to FIG. 10.

In some embodiments, the smart doorbell is detected by the visitor mobile device if the visitor mobile device is within the geofence created around the smart doorbell. The detection is made by the visitor mobile device querying a server for smart wireless doorbells in its vicinity based on the GPS/location coordinates of the visitor mobile device. The detection may also be through P2P communication, i.e., discovery of RF beacons emitted by smart wireless doorbells and analyzed by the visitor mobile device. For example, upon receiving a beacon, the mobile device may measure the beacon signal strength to determine whether the beacon is within a proximate or predetermined distance or a geofence created by and around the smart doorbell. If it is not within a proximate or predetermined distance or a geofence created, then the doorbell communication platform accessed by the visitor mobile device via a cloud API may not display the smart doorbell on the UI of the visitor mobile device. On the other hand, if the beacon received from the smart doorbell is determined to be within a proximate or predetermined distance or a geofence created, then the UI may display the smart doorbell.

In another embodiment, instead of the smart doorbell being detected by the visitor mobile device, the smart doorbell may perform the detection to determine whether a visitor mobile device is within a proximate or predetermined distance or a geofence created around the smart doorbell. For example, to determine whether a visitor mobile device is within the geofence, RF beaconing technique may be used. For example, an RF beacon may be transmitted by the smart doorbell at a controlled power, so that only mobile devices in the vicinity may receive it, thus enforcing the geofence. Alternatively, the mobile device may receive the RF beacon and also check received power. If the received power is above a threshold, then the mobile device is within the geofence of the smart doorbell. If a determination is made that the visitor mobile device is within the proximate or predetermined distance or a geofence created around the smart doorbell, then the UI on the visitor mobile device may display the smart doorbell.

At block 102, one example of a UI displayed on the visitor mobile device is depicted. Although the depicted example includes a plurality of buttons that can be selected by the visitor who is associated with the visitor mobile device, the embodiments are not so limited, and other types of configurations and displays, including icons, different styles/shapes of buttons, or some other selectable features, that can be selected by the visitor mobile device are also contemplated within the embodiments.

In some embodiments, at block 102, exemplary options (e.g., buttons, icons, or other selectable features) that may be displayed by the UI of the visitor mobile device may include a "press/ring doorbell option," a "talk" option, a "text" option, a "video chat" option, a "send marketing information" option, "leave voice note" option, "send image" option, "send video," option, and send "electronic file" option. Other options may also be configured by the smart doorbell, the platform of the smart doorbell, the server associated with the smart doorbell, or a resident of the house or structure where the smart doorbell is located. These options may relate to different types of communications options that may be made available to the visitor mobile device for communicating with the smart doorbell. The options may also provide information as to what types of information may be sent by the visitor mobile device to the smart doorbell, such as type of advertising, images, etc. It may also provide restrictions as to what cannot be sent and if the visitor mobile device tries to send the restricted information, such information may be detected, flagged, and prevented from being transmitted (such as via a smart doorbell communications application on the visitor mobile device) or rejected upon receipt from the smart doorbell.

Which communication options, from the plurality of communication options displayed in block 102, are made available to the visitor mobile device may depend on the attributes and characteristics of the visitor mobile device. Selection of any of the communication options by the visitor mobile device may send a request to the smart doorbell indicating that the visitor mobile device desires to communicate with the smart doorbell using the selected communication option, e.g., talk, text, or ring the smart doorbell. The smart doorbell receiving the request to communicate with the selected communication option may obtain attributes of the visitor mobile device at block 103, analyze those attributes, and either approve or deny the communication request at block 104.

In some embodiments, instead of displaying the communication options at block 102, selection of which would send a request to the smart doorbell that the visitor mobile device desires to communicate using the selected communication option, the UI of the visitor mobile device may first display a button, icon, or selectable feature that is simply a request to communicate. In this embodiment, the visitor mobile device selecting the request to communicate would result in the request being transmitted to the smart doorbell. The smart doorbell may then evaluate the request, along with the visitor mobile device's attributes, to determine whether to accept the request. Only upon approval of such a request, and based on the visitor mobile device's attributes, would communication options that are allowed be displayed on the visitor mobile device. As such, in this embodiment, blocks 103 and 104 may precede block 102. For example, in this embodiment, the smart doorbell receiving the request to communicate may determine based on the visitor mobile device's attributes that the visitor associated with the visitor mobile device is a solicitor/advertiser. Also, in this example, the resident of the home of the smart doorbell may have a policy of not engaging with solicitors/advertisers and only receiving their advertising materials. Accordingly, instituting the policy, the smart doorbell, or the server associated with the smart doorbell, via the cloud API, may cause a display of only one communication option on the visitor mobile device, e.g., the communication option to send marketing material.

Referring to block 103, the smart doorbell, or control circuitry 320 and/or 328 (of FIG. 3), may obtain attributes associated with the visitor mobile device. The attributes may be obtained when a request to communicate is initially sent to the smart doorbell, or control circuitry 320 and/or 328, or it may be obtained after the request is received, or at any time during the request and exchange of initial communications. In some embodiments, the smart doorbell, or control circuitry 320 and/or 328, may ping the visitor mobile device to request attributes. In response, the visitor mobile device may transmit the attributes to the smart doorbell, or control circuitry 320 and/or 328. In some embodiments, the visitor mobile device may provide all its attributes, and in other embodiments, the visitor mobile device may, protecting its own privacy, only provide certain attributes. In the event that the visitor mobile device holds back relevant information, the resident may not know who the visitor is or their purpose of visit and as such may not be incentivized to communicate with the visitor mobile device. In some embodiments, the smart doorbell, or control circuitry 320 and/or 328, may specify exactly which attributes are requested, and the visitor mobile device in response may provide all or some of the requested attributes.

In some embodiments, the attributes may include the name of the user associated with the visitor mobile device. They may also include details such as the purpose of the visit, which the visitor mobile device may provide. It may also include the visitor mobile device's information, the visitor automobile's information, visitor's identification, visitor's email or phone number, and other relevant information about the visitor.

In some embodiments, if the visitor is an advertiser or solicitor, then they may also wish to provide their job function, name of their company, what product are they advertising, etc. The resident of the home, where the smart doorbell is located, may be provided with the ability to opt out of the advertisements altogether, i.e., visitor mobile device that wish to wirelessly communicate with the smart doorbell may not be able to wirelessly send advertisements and will be required to walk up to their door, press the smart wireless doorbell, and communicate with the owner through the session established at the doorbell. This opt-out may be temporarily or permanently enabled. In some embodiments, resident of the home may configure their smart doorbell to respond selectively when another mobile device receives their beacon and requests a communication session—for example, users may be able to restrict responses only to those on their contact list.

In some embodiments, the smart doorbell, or control circuitry 320 and/or 328 (of FIG. 3), after obtaining attributes associated with the visitor mobile device may recognize the visitor mobile device, such as a device seen or visited before to the same house with the smart doorbell. In such instances, an ID may be assigned to a visitor mobile device such that repeated visits can bypass the initiation process and the same type of communication can be allowed as in previous visits. On the other hand, if the visitor mobile device was not allowed before, then it may be assigned an ID and placed on a restricted list. If that same visitor mobile device visits again, it may be automatically rejected or options to communicate may not be presented to the visitor mobile device. The smart doorbell may also alert the visitor mobile device that has been restricted and indicate that the resident does not wish to receive their information (or some other message alerting the visitor mobile device).

In some embodiments, the visitor mobile device may simply send a request to communicate and not indicate the type or format of communication they wish to use to communicate with the smart doorbell. In other embodiments, as depicted in block 103, both the type of communication requested by the visitor mobile device and the attributes may be received by the smart doorbell, or control circuitry 320 and/or 328. In this example, the visitor mobile device's request is to communicate with the smart doorbell by pressing/ringing the doorbell. The attributes received by the smart doorbell, or control circuitry 320 and/or 328, include name (John Doe), sex (Male), purpose (distribute flyer for pest control), device details (Samsung Galaxy™ smart phone), contact details (email, phone number, ID), other forms of identification relating to the visitor, and history of previously visits or being in the vicinity. All such details may be stored in a profile of the visitor mobile device and transmitted to the smart doorbell, or control circuitry 320 and/or 328. In some embodiments, the visitor mobile device may store separately in the device, or as a separate profile, only those attributes they wish to share with the smart doorbell, or control circuitry 320 and/or 328.

In some embodiments, the profile of the visitor mobile device may also include any history of previous visits by the visitor mobile device in the vicinity of the smart doorbell or within the geofence created around the smart doorbell. Such visit history may be captured by the visitor mobile device based on its historical GPS locations and shared with the smart doorbell, or control circuitry 320 and/or 328. Obtaining such history may allow the smart doorbell, or control circuitry 320 and/or 328, to determine whether the visitor mobile device previously visited there and whether there is anything that would cause any suspicion. For example, if the visitor mobile device visited the area multiple times in a day without any request being sent or any other action being taking, such repeat occurrences could be evaluated further to determine whether they meet the standards set by the smart doorbell, or control circuitry 320 and/or 328, for a suspicious activity, such as stalking.

At block 104, the smart doorbell, or control circuitry 320 and/or 328, may approve or deny the request from the visitor mobile device to communicate with the smart doorbell. There may be various forms of approvals and denials that can be provided by the smart doorbell, or control circuitry 320 and/or 328. These include approving the request to communicate, approving the type/format of communication in the communication type/format requested, approving the request to communicate but not in the type/format of communication requested, denying the request to communicate, denying the type/format of communication requested, suggesting alternative communication types for communicating (e.g., text instead of video call or email to send materials in an electronic format instead of talking). In some embodiments, the user may configure the smart doorbell to forward every request to access the doorbell to them, rather than having the system make the decision to approve/deny the request. In some embodiments, this may be the default option for the smart doorbell.

In some embodiments, the smart doorbell, or control circuitry 320 and/or 328, may determine which types of communications to allow between the visitor mobile device and the smart doorbell based on the attributes received and the context of the visit. The smart doorbell may have stored preferences in a profile that map each attribute, or collectively the set of attributes, to types of communications allowed. The visitor mobile device may also provide context of the visit to the smart doorbell, or control circuitry 320 and/or 328. In some instances, the smart doorbell, or control circuitry 320 and/or 328, may prompt the visitor mobile device to provide the context of the visit, and in other embodiments, the context may be determined based on other sources, such as previously exchanged texts, or an image of the visitor, such as a visitor wearing a Pizza Delivery company uniform, etc. Some examples of types of communications allowed based on the determined attributes and context are described in relation to FIG. 8.

At block 105, the smart doorbell, or control circuitry 320 and/or 328, may activate an approved communication option. For example, if the smart doorbell, or control circuitry 320 and/or 328, determines based on the attributes that the type of communication allowed is press/ring the smart doorbell, then the smart doorbell, or control circuitry 320 and/or 328, may cause a display of an icon, button, or some other selectable feature that displays the "press/ring doorbell" option on the visitor mobile device. In some embodiments, all the communication options may be displayed on the visitor mobile device's UI at the outset but greyed out until approved for communication, and in other embodiments, only the allowed communication option may be displayed upon approval by the smart doorbell. In yet other embodiments, communications may be set only in one specific mode (e.g., text, voice message, video message, ring, etc.), such as a predetermined mode for receiving and a predetermined mode for transmitting by the smart doorbell.

The visitor mobile device may then select the displayed communication option, such as the "press/ring doorbell" option and communicate with the doorbell. In this scenario, if the user associated with the visitor mobile device selected the "press/ring doorbell" option, then a speaker connected to the doorbell, such as a speaker located on the doorbell or inside the house where the doorbell is located, may produce a ringing sound to inform the resident of the house that someone is ringing the doorbell. In some embodiments, the resident/owner of the home where the smart doorbell is located may not want a ringing sound from a speaker to avoid any sound disturbance. In such circumstances, a silent press option may be presented to the visitor mobile device that may allow other communication options without having to audibly ring the smart doorbell. In yet other embodiments, the doorbell may also provide an alert, such as a push notification, with an option for the homeowner to respond to the approved communication option in their host device.

In some embodiments, the types of rings that may be produced may also be based on the attributes and the context of the visit. For example, the resident of a house associated with the doorbell may set different ringtones for different types of visitors (e.g., friend on contact list, immediate family, neighbor, solicitor/advertiser, etc.). The resident of a house associated with the doorbell may also establish a prioritized list of doorbell responders (e.g., dad>mom>teenage child>child) and only notify the top priority owner. Based on the established priority, after a period of no response from the top priority owner, the system may remove them from the list and notify the next top priority owner (e.g., if dad has not responded, then move to mom). The process may be repeated until someone answers the door or responds via the smart doorbell with a message to the visitor mobile device. The resident of a house associated with the doorbell may also configure high priority doorbell rings and have the smart doorbell notify multiple top respondents simultaneously. The doorbell may also be configured such as to direct communication to only the resident of the house for whom the visitor mobile device is visiting, e.g., if a boyfriend of the daughter is visiting, then the smart doorbell may direct the communication to the daughter rather than another resident of the house. A smart doorbell might be associated with multiple profiles (e.g., parents, daughter, son, etc.) and each profile might be associated with its own ring tone, whether annunciated in the house via a speaker, or on a host device associated with the smart doorbell. In some embodiments, the smart doorbell may also be connected to a media device. If the resident is consuming content, notifications from the smart doorbell (such as a text, video, image received from the visitor mobile device) may be displayed as a pop-up window or in some other format on the screen of the media device.

In yet more embodiments, the resident of a house associated with the doorbell may tie an action to the information accompanying a doorbell press from a visitor mobile device. For example, rules may be configured to automatically respond to certain occurrences, such as if this then that (IFTTT) rule. In one example of the implementation of the IFTTT rule, the smart doorbell may receive an electronic file along with the doorbell press. The electronic file may contain the identity of the user associated with the smart mobile device, which may have been electronically validated by another $3^{rd}$ party (typically a root of trust). The file may include an indication of the verification, such as a watermark or secret that is known to the owner (i.e., it is pre-configured by the owner) or to the root of trust. When the smart mobile device receives such an electronic file, it may, applying the preconfigured rules, such as an IFTTT rule, may automatically execute the associated action. For example, such an action may include informing the resident of the home, opening a garage door, open a door lock, or responding with a do not disturb message.

At block 106, once the visitor mobile device moves away a predetermined distance from the smart doorbell or moves outside the geofence area surrounding the smart doorbell, the smart doorbell or control circuitry 320 and/or 328 may automatically disable a previously enabled communication option.

FIG. 2 is a block diagram of a process 200 for establishing a neighborhood watch using a plurality of smart doorbells that are communicatively connected to each other, in accordance with some embodiments of the disclosure. The process 200 may be implemented, in whole or in part, by systems or devices such as those shown in FIGS. 3-4. One or more actions of the process 200 may be incorporated into or combined with one or more actions of any other process or embodiments described herein. The process 200 may be saved to a memory or storage (e.g., any one of those depicted in FIGS. 3-4) as one or more instructions or routines that may be executed by a corresponding device or system to implement the method 200.

In some embodiments, at block 201, a server may transmit a request to a plurality of doorbells to join a neighborhood watch. The smart doorbells to which the server transmits the request to join may be on the same street or within a predetermined distance from where the server is located, or they may be part of a housing complex, subdivision, or community. In some embodiments, the server may select a primary smart doorbell in the neighborhood. The primary smart doorbell may be at the center of the street or what the server may define as the center of the neighborhood. The server may then send the join request to all the smart doorbells that are within a predetermined distance of the primary smart doorbell. The server may also transmit a join neighborhood watch request to smart doorbells that are associated with homes that are managed by a same homeowner's association. In other embodiments, a smart doorbell may directly send a request to the server to join the homeowners association, and the server may approve or deny the request. In some embodiments, a smart doorbell may directly send a request to the server to join a first neighborhood watch; however, based on the geographic location of the smart doorbell, the server may determine that the smart doorbell should be associated with the second neighborhood watch that is closer to the area where the smart doorbell is located. In some embodiments, a first server for a first neighborhood may be communicatively connected to a second server in a second neighborhood and also exchange information that may be relevant to the second neighborhood. For example, if a theft or burglary is detected in the first neighborhood and a determination is made that the burglar is headed towards the second neighborhood, then the first server from the first neighborhood may inform the second server from the second neighborhood to send an alert to all the smart doorbells in the second neighborhood alerting them of the activity.

At block 202, the smart doorbell may receive the request to join the neighborhood watch from the server and accept the received request. In another embodiment, if the smart doorbell has initiated the request to join, then the server may accept the request to join the smart doorbell to the neighborhood watch.

At block 203, the server may create a neighborhood watch group that consists of all the doorbells that have been joined into the neighborhood watch. As depicted at block 203, in this example, doorbells 1, 3, 4, 6, 8-12, and 14 may be grouped together in neighborhood watch number one.

At block 204, any one of the smart doorbells from the formed neighborhood watch group at block 203 may detect an activity. In one embodiment, the activity may be detected via a camera of a smart doorbell. For example, the camera associated with the smart doorbell may capture an activity within its field of view and report such activity to the server. In another embodiment, the activity may also be detected based on a wireless signal received from the smart doorbell. For example, if an intruder is hiding in the bushes near a house and the intruder has a wireless device, such as a mobile phone, then any signals emitted by the mobile phone may be captured by the smart doorbell to detect the activity. In yet another embodiment, the smart doorbell may include a microphone and may detect an activity based on sounds captured by the microphone. In yet another embodiment, the smart doorbell may include a motion sensor and may detect an activity based on motion captured by the motion sensor. In yet another embodiment, a camera associated with the smart doorbell may capture an image of an automobile's license plate. In yet another embodiment, another device associated with the smart doorbell platform, such as a camera installed elsewhere may detect an activity. The smart doorbell may obtain data related to the license plate and transmit any activity related to the automobile to the server.

At block 205, the server may receive details associated with the captured activity from block 204. For example, the server may receive images or videos captured, sound or motion captured, wireless signal captured, automobile license plate captured, or any other data captured by the smart doorbell, or any device communicatively connected to the smart doorbell (e.g., security cameras, etc.) The server may then determine if the activity is suspicious. Some examples of suspicious activity may include a break-in, a burglary, a robbery, trespassing, loitering, lurking, and unauthorized entry to property grounds (e.g., via backyard).

In some embodiments, the server may utilize an artificial intelligence (AI) engine to execute an AI algorithm to determine whether the activity detected in block 204 meets the criteria of a suspicious activity. For example, if a video is captured by a camera associated with a smart doorbell, such a video may be analyzed by the server via the AI algorithm to determine whether activity captured in such video meet the criteria of a suspicious activity. In some embodiments, one or more sources of data may be combined together to determine whether the activity meets the criteria of a suspicious activity. For example, if the video captured by a camera of the smart doorbell shows a stranger walking across a yard of a house and a microphone of the smart doorbell picks up the sound of breaking glass, then both pieces of data may be analyzed together to determine whether there was a break-in in the house (e.g., such as a burglar breaking a glass window to get inside the house).

If a determination is made at block 205 that the activity of block 204 is a suspicious activity, then at block 206, the server may transmit an alert to all the smart doorbells in the neighborhood watch group. In some embodiments, the server may also send an alert to a local police department informing them of the activity, such as the break-in. In yet another embodiment, the server associated with the smart doorbell may be connected to a plurality of IoT devices within the house and it may activate such devices to scare off the burglar. For example, smart IoT devices, such as lights in the house, may be turned on and off, a television may be turned on and off and its sound may be increased, or an audio of a speaker may be played to deter the burglar by giving the impression that someone may be inside the house.

Figure 3:
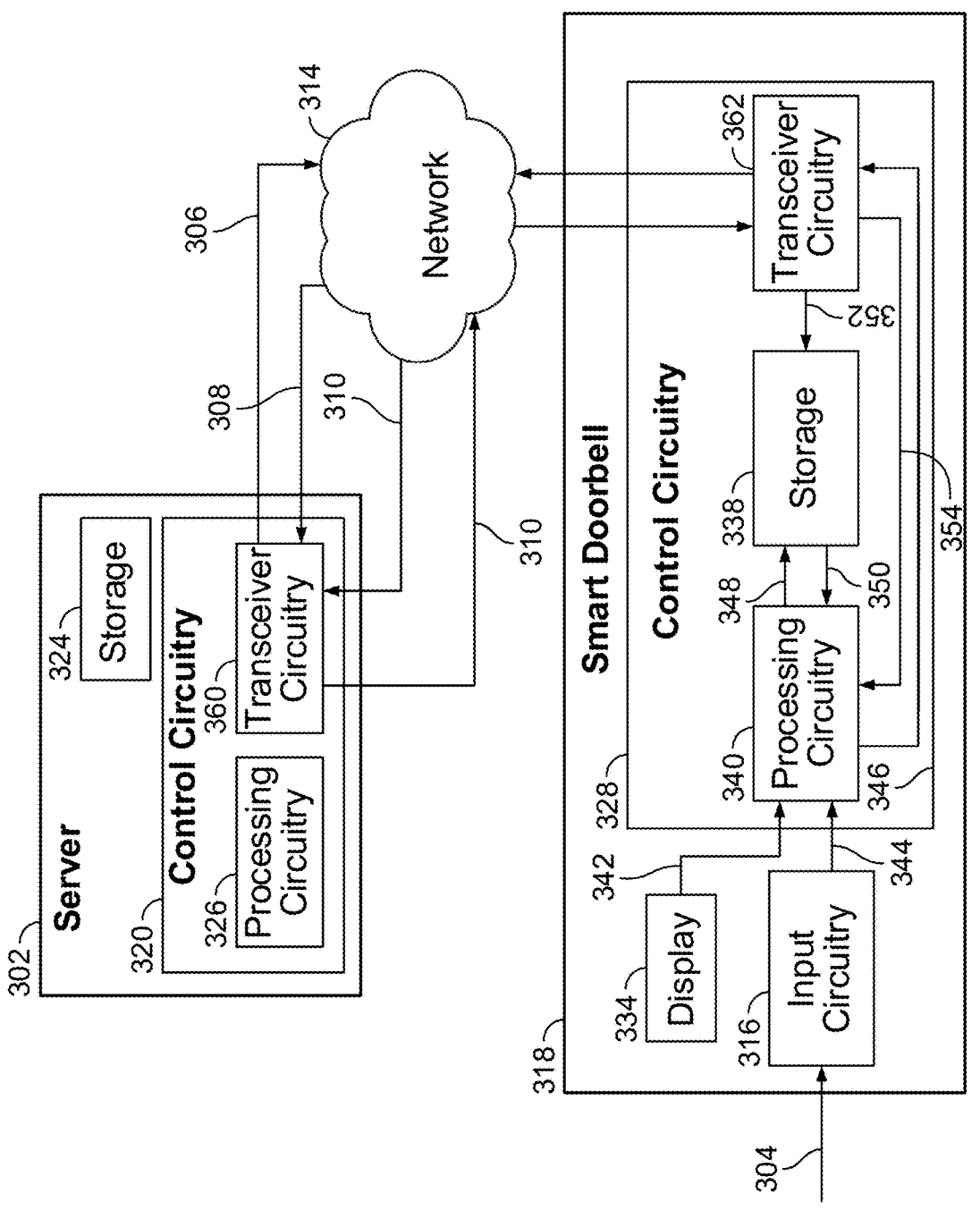
FIG. 3 is a block diagram of an example system for establishing communications between a smart doorbell and a visitor mobile device and for creating a neighborhood watch, in accordance with some embodiments of the disclosure.

FIG. 3 is a block diagram of an example system for establishing communications between a smart doorbell and a visitor mobile device and for creating a neighborhood watch, in accordance with some embodiments of the disclosure.

Figure 4:
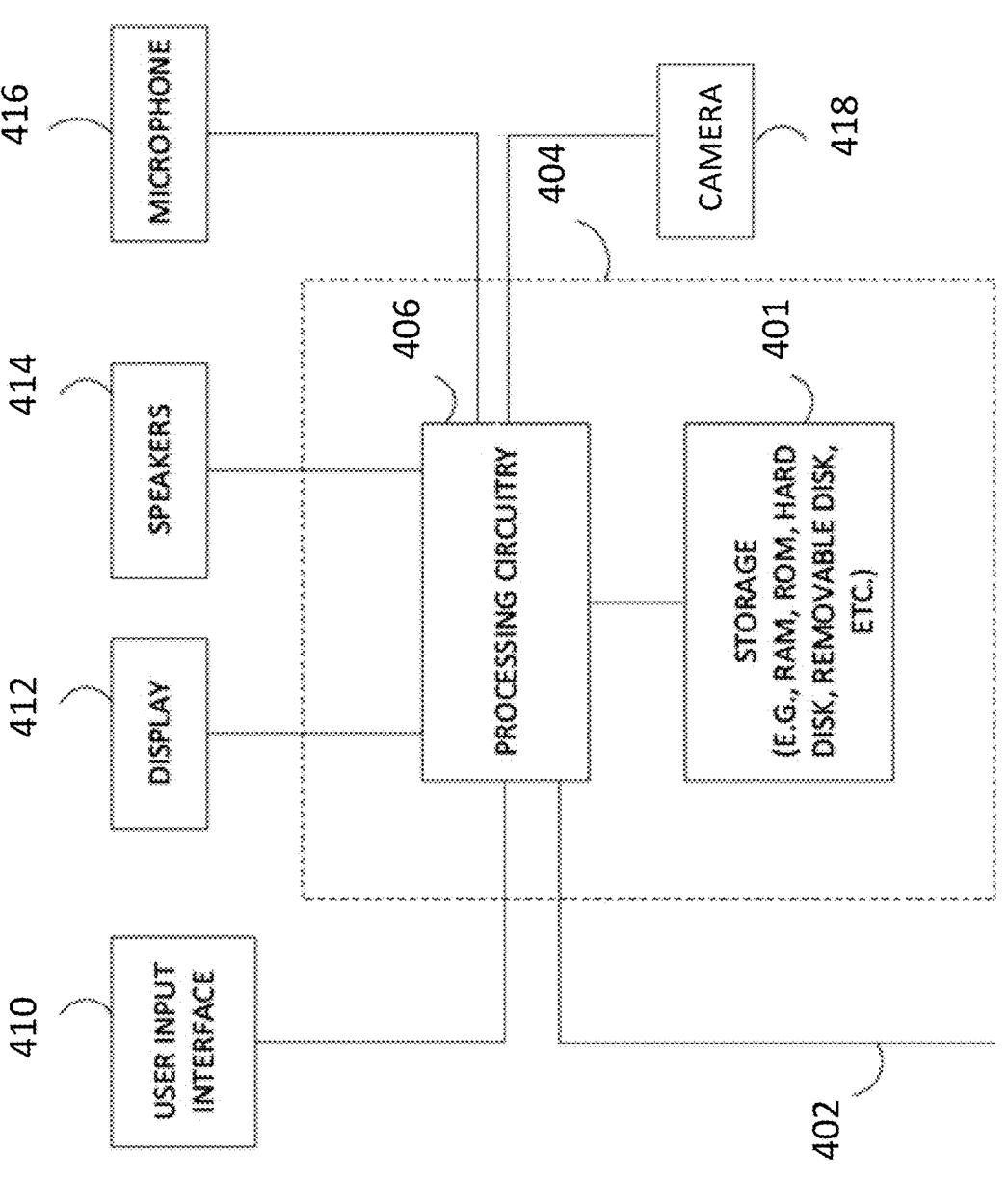
FIG. 4 is a block diagram of components of a smart doorbell, in accordance with some embodiments of the disclosure.

FIGS. 3 and 4 also describe example devices, systems, servers, and related hardware that may be used to implement processes, functions, and functionalities described at least in relation to FIGS. 1-2 and 5-12. Further, FIGS. 3 and 4 may also be used for creating geofences, such as around the smart doorbell, detecting visitor mobile devices within the created geofences, providing access to visitor mobile devices to communicate with the smart doorbell, obtaining identity and other attributes from the visitor mobile devices, analyzing the obtained identity and other attributes from the visitor mobile device to determine whether to allow communication with the smart doorbell and if so the type of communication to allow (e.g. text, chat, video call, ring bell, etc.), approving or denying communication requests from visitor mobile devices, ringing the smart doorbell on a speaker based on the type of visitor mobile devices (e.g., friend, neighbor, daughter's boyfriend, ecommerce delivery person, advertiser, etc.), monitoring vicinity of the visitor mobile devices and deactivating communications if the visitor mobile devices leaves the vicinity or geofence area, determining visitor mobile device location on a map, determining signal strength of the visitor mobile device, generating maps based on angle of arrival of beacons from the visitor mobile device, transmitting and receiving beacons emitted from smart doorbells and visitor mobile devices, inviting smart doorbells to join in a neighborhood watch program, receiving requests to join the neighborhood watch program, establishing neighborhood watch programs with a plurality of smart doorbells, transmitting alerts as part of the neighborhood watch program to the smart doorbells in the program, monitoring suspicious activities and reporting them, such as via alerts to all the smart doorbells in the program and/or the police, analyzing activity to determine if it is suspicious, activating home IoT devices based on type of suspicious activity detected, and performing functions related to all other processes and features described herein.

In some embodiments, one or more parts of, or the entirety of system 300, may be configured as a system implementing various features, processes, functionalities and components of FIGS. 1-2 and 5-12. Although FIG. 3 shows a certain number of components, in various examples, system 300 may include fewer than the illustrated number of components and/or multiples of one or more of the illustrated number of components.

System 300 is shown to include a computing device 318, a server 302 and a communication network 314. It is understood that while a single instance of a component may be shown and described relative to FIG. 3, additional instances of the component may be employed. For example, server 302 may include, or may be incorporated in, more than one server. Similarly, communication network 314 may include, or may be incorporated in, more than one communication network. Server 302 is shown communicatively coupled to computing device 318 through communication network 314. While not shown in FIG. 3, server 302 may be directly communicatively coupled to computing device 318, for example, in a system absent or bypassing communication network 314.

Communication network 314 may comprise one or more network systems, such as, without limitation, an internet, LAN, WIFI or other network systems suitable for audio processing applications. In some embodiments, system 300 excludes server 302, and functionality that would otherwise be implemented by server 302 is instead implemented by other components of system 300, such as one or more components of communication network 314. In still other embodiments, server 302 works in conjunction with one or more components of communication network 314 to implement certain functionality described herein in a distributed or cooperative manner. Similarly, in some embodiments, system 300 excludes computing device 318, and functionality that would otherwise be implemented by computing device 318 (i.e., smart doorbell) is instead implemented by other components of system 300, such as one or more components of communication network 314 or server 302 or a combination. In still other embodiments, computing device 318 works in conjunction with one or more components of communication network 314 or server 302 to implement certain functionality described herein in a distributed or cooperative manner.

Computing device 318 includes control circuitry 328, display 334 and input circuitry 316. Control circuitry 328 in turn includes transceiver circuitry 362, storage 338 and processing circuitry 340. In some embodiments, computing device 318 or control circuitry 328 may be configured as electronic device 400 of FIG. 4, which may be a smart doorbell.

Server 302 includes control circuitry 320 and storage 324. Each of storages 324 and 338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 4D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 324, 338 may be used to store various types of content (e.g., geofence areas and coordinates, location maps, IDs of visitor mobile devices, historical data relating to visitor mobile devices [e.g., previous visits to the same home, pizza delivery person, etc.], ring tones associated with different visitor mobile devices, smart doorbells joined into a neighborhood watch, activity captured by any of the smart doorbells, links to such activities, automated messages configured to be delivered to certain visitor mobile devices, association of which visitor mobile device is visiting which resident of the home, alerts generated as part of the neighborhood watch, IFTT rules or other types of rules for responding automatically to visitor mobile devices and AI and ML algorithms). Non-volatile memory may also be used (e.g., to launch a boot-up routine, launch an app, render an app, and other instructions). Cloud-based storage may be used to supplement storages 324, 338 or instead of storages 324, 338. In some embodiments, data relating to geofence areas and coordinates, location maps, IDs of visitor mobile devices, historical data relating to visitor mobile devices [e.g., previous visits to the same home, pizza delivery person, etc.], ring tones associated with different visitor mobile devices, smart doorbells joined into a neighborhood watch, activity captured by any of the smart doorbells, links to such activities, automated messages configured to be delivered to certain visitor mobile devices, association of which visitor mobile device is visiting which resident of the home, alerts generated as part of the neighborhood watch, IFTT rules or other types of rules for responding automatically to visitor mobile devices and AI and ML algorithms, may be recorded and stored in one or more of storages 312, 338.

In some embodiments, control circuitries 320 and/or 328 executes instructions for an application stored in memory (e.g., storage 324 and/or storage 338). Specifically, control circuitries 320 and/or 328 may be instructed by the application to perform the functions discussed herein. In some implementations, any action performed by control circuitries 320 and/or 328 may be based on instructions received from the application. For example, the application may be implemented as software or a set of executable instructions that may be stored in storage 324 and/or 338 and executed by control circuitries 320 and/or 328. In some embodiments, the application may be a client/server application where only a client application resides on computing device 318, and a server application resides on server 302.

The application may be implemented using any suitable architecture. For example, it may be a stand-alone application wholly implemented on computing device 318. In such an approach, instructions for the application are stored locally (e.g., in storage 338), and data for use by the application is downloaded on a periodic basis (e.g., from an out-of-band feed, from an internet resource, or using another suitable approach). Control circuitry 328 may retrieve instructions for the application from storage 338 and process the instructions to perform the functionality described herein. Based on the processed instructions, control circuitry 328 may determine a type of action to perform in response to input received from input circuitry 316 or from communication network 314. For example, in response to determining that the visitor mobile device is associated with an advertiser, the control circuitry may automatically generate a temporary email or phone number and transmit that generated temporary email or phone number such that visitor mobile device can use the temporary email or phone number to send advertising material to the smart mobile device. It may also perform steps of processes described in FIGS. 1-2, and 8-12.

In client/server-based embodiments, control circuitry 328 may include communication circuitry suitable for communicating with an application server (e.g., server 302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 314). In another example of a client/server-based application, control circuitry 328 runs a web browser that interprets web pages provided by a remote server (e.g., server 302). For example, the remote server may store the instructions for the application in a storage device. The remote server may process the stored instructions using circuitry (e.g., control circuitry 328) and/or generate displays. Computing device 318 may receive the displays generated by the remote server and may display the content of the displays locally via display 334. This way, the processing of the instructions is performed remotely (e.g., by server 302) while the resulting displays, such as the display windows described elsewhere herein, are provided locally on computing device 318. Computing device 318 may receive inputs from the user via input circuitry 316 and transmit those inputs to the remote server for processing and generating the corresponding displays. Alternatively, computing device 318 may receive inputs from the user via input circuitry 316 and process and display the received inputs locally, by control circuitry 328 and display 334, respectively.

Server 302 and computing device 318 may transmit and receive content and data such as communication options to communicate with the smart doorbell, visitor mobile ID, alerts to neighboring smart doorbells subscribed to a neighborhood watch, etc. Control circuitry 320, 328 may send and receive commands, requests, and other suitable data through communication network 314 using transceiver circuitry 360, 362, respectively. Control circuitry 320, 328 may communicate directly with each other using transceiver circuits 360, 362, respectively, avoiding communication network 314.

It is understood that computing device 318 is not limited to the embodiments and methods shown and described herein. In nonlimiting examples, computing device 318 may be an electronic device, a personal computer (PC), a laptop computer, a tablet computer, a WebTV box, a personal computer television (PC/TV), a PC media server, a PC media center, a handheld computer, a mobile telephone, a smartphone, or any other device, computing equipment, or wireless device, and/or combination of the same capable of suitably determining desired content discomfort ratings, displaying content items, an selecting versions of contents items to be displayed.

Control circuitries 320 and/or 318 may be based on any suitable processing circuitry such as processing circuitry 326 and/or 340, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitries 320 and/or control circuitry 318 are configured for creating geofences, such as around the smart doorbell, detecting visitor mobile devices within the created geofences, providing access to visitor mobile devices to communicate with the smart doorbell, obtaining identity and other attributes from the visitor mobile devices, analyzing the obtained identity and other attributes from the visitor mobile device to determine whether to allow communication with the smart doorbell and if so the type of communication to allow (e.g. text, chat, video call, ring bell, etc.), approving or denying communication requests from visitor mobile devices, ringing the smart doorbell on a speaker based on the type of visitor mobile devices (e.g., friend, neighbor, daughter's boyfriend, ecommerce delivery person, advertiser, etc.), monitoring vicinity of the visitor mobile devices and deactivating communications if the visitor mobile devices leaves the vicinity or geofence area, determining visitor mobile device location on a map, determining signal strength of the visitor mobile device, generating maps based on angle of arrival of beacons from the visitor mobile device, transmitting and receiving beacons emitted from smart doorbells and visitor mobile devices, inviting smart doorbells to join in a neighborhood watch program, receiving requests to join the neighborhood watch program, establishing neighborhood watch programs with a plurality of smart doorbells, transmitting alerts as part of the neighborhood watch program to the smart doorbells in the program, monitoring suspicious activities and reporting them, such as via alerts to all the smart doorbells in the program and/or the police, analyzing activity to determine if it is suspicious, activating home IoT devices based on type of suspicious activity detected, and performing functions related to all other processes and features described herein.

Computing device 318 receives a user input 304 at input circuitry 316. For example, computing device 318 may receive ID information from a visitor mobile device, advertising materials from a visitor mobile device, a request to communicate from the visitor mobile device, and a request to join a neighborhood watch from a smart doorbell in a neighborhood.

Transmission of user input 304 to computing device 318 may be accomplished using a wired connection, such as an audio cable, USB cable, ethernet cable or the like attached to a corresponding input port at a local device, or may be accomplished using a wireless connection, such as Bluetooth, WIFI, WiMAX, GSM, UTMS, CDMA, TDMA, 3G, 4G, 4G LTE, or any other suitable wireless transmission protocol. Input circuitry 316 may comprise a physical input port such as a 3.5 mm audio jack, RCA audio jack, USB port, ethernet port, or any other suitable connection for receiving audio over a wired connection or may comprise a wireless receiver configured to receive data via Bluetooth, WIFI, WiMAX, GSM, UTMS, CDMA, TDMA, 3G, 4G, 4G LTE, or other wireless transmission protocols.

Processing circuitry 340 may receive input 304 from input circuit 316. Processing circuitry 340 may convert or translate the received user input 304 that may be in the form of voice input into a microphone, or movement or gestures to digital signals. In some embodiments, input circuit 316 performs the translation to digital signals. In some embodiments, processing circuitry 340 (or processing circuitry 326, as the case may be) carries out disclosed processes and methods. For example, processing circuitry 340 or processing circuitry 326 may perform processes as described in FIGS. 1-2, and 8-12, respectively.

FIG. 4 is a block diagram of components of a smart doorbell, in accordance with some embodiments of the disclosure. In some embodiments, the equipment device 400, is the same equipment device 302 of FIG. 3, e.g., a smart doorbell. The equipment device 400 may receive content and data via input/output (I/O) path 402. The I/O path 402 may provide audio content (e.g., such as in the speakers associated with the smart doorbell). The control circuitry 404 may be used to send and receive commands, requests, and other suitable data using the I/O path 402. The I/O path 402 may connect the control circuitry 404 (and specifically the processing circuitry 406) to one or more communications paths or links (e.g., via a network interface), any one or more of which may be wired or wireless in nature. Messages and information described herein as being received by the equipment device 400 may be received via such wired or wireless communication paths. I/O functions may be provided by one or more of these communications paths or intermediary nodes but are shown as a single path in FIG. 4 to avoid overcomplicating the drawing.

The control circuitry 404 may be based on any suitable processing circuitry such as the processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 or i9 processor).

In client-server-based embodiments, the control circuitry 404 may include communications circuitry suitable for creating geofences, such as around the smart doorbell, detecting visitor mobile devices within the created geofences, providing access to visitor mobile devices to communicate with the smart doorbell, obtaining identity and other attributes from the visitor mobile devices, analyzing the obtained identity and other attributes from the visitor mobile device to determine whether to allow communication with the smart doorbell and if so the type of communication to allow (e.g. text, chat, video call, ring bell, etc.), approving or denying communication requests from visitor mobile devices, ringing the smart doorbell on a speaker based on the type of visitor mobile devices (e.g., friend, neighbor, daughter's boyfriend, ecommerce delivery person, advertiser, etc.), monitoring vicinity of the visitor mobile devices and deactivating communications if the visitor mobile devices leaves the vicinity or geofence area, determining visitor mobile device location on a map, determining signal strength of the visitor mobile device, generating maps based on angle of arrival of beacons from the visitor mobile device, transmitting and receiving beacons emitted from smart doorbells and visitor mobile devices, inviting smart doorbells to join in a neighborhood watch program, receiving requests to join the neighborhood watch program, establishing neighborhood watch programs with a plurality of smart doorbells, transmitting alerts as part of the neighborhood watch program to the smart doorbells in the program, monitoring suspicious activities and reporting them, such as via alerts to all the smart doorbells in the program and/or the police, analyzing activity to determine if it is suspicious, activating home IoT devices based on type of suspicious activity detected, and performing functions related to all other processes and features described herein.

The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the internet or any other suitable communications networks or paths. In addition, communications circuitry may include circuitry that enables peer-to-peer communication of primary equipment devices, or communication of primary equipment devices in locations remote from each other (described in more detail below).

Memory may be an electronic storage device provided as the storage 401 that is part of the control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 401 may be used to store various types of content, (e.g., data related to geofence areas and coordinates, location maps, IDs of visitor mobile devices, historical data relating to visitor mobile devices [e.g., previous visits to the same home, pizza delivery person, etc.], ring tones associated with different visitor mobile devices, smart doorbells joined into a neighborhood watch, activity captured by any of the smart doorbells, links to such activities, automated messages configured to be delivered to certain visitor mobile devices, association of which visitor mobile device is visiting which resident of the home, alerts generated as part of the neighborhood watch, IFTTT rules or other types of rules for responding automatically to visitor mobile devices and AI and ML algorithms. Cloud-based storage, described in relation to FIG. 4, may be used to supplement the storage 401 or instead of the storage 401.

The control circuitry 404 may include audio generating circuitry and tuning circuitry, such as one or more analog tuners, audio generation circuitry, filters or any other suitable tuning or audio circuits or combinations of such circuits. The control circuitry 404 may also include scaler circuitry for upconverting and down converting content into the preferred output format of the electronic device 400. The control circuitry 404 may also include digital-to-analog converter circuitry and analog-to-digital converter circuitry for converting between digital and analog signals. The tuning and encoding circuitry may be used by the electronic device 400 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 401 is provided as a separate device from the electronic device 400, the tuning and encoding circuitry (including multiple tuners) may be associated with the storage 401.

The user, who may typically be a visitor, may utter instructions to the control circuitry 404, which are received by the microphone 416. The microphone 416 may be any microphone (or microphones) capable of detecting human speech. The microphone 416 is connected to the processing circuitry 406 to transmit detected voice commands and other speech thereto for processing. In some embodiments, voice assistants (e.g., Siri, Alexa, Google Home and similar such voice assistants) receive and process the voice commands and other speech.

A camera 418 may also be associated with the electronic device 400. Images and video input may be obtained by the camera and provided to the processing circuitry for processing.

The electronic device 400 may include an interface 410. The interface 410 may be any suitable user interface, such as a button or a doorbell, remote control, mouse, trackball, keypad, keyboard, touchscreen, touchpad, stylus input, or other user input interfaces. A display 412 may be provided as a stand-alone device or integrated with other elements of the electronic device 400. For example, the display 412 may be a touchscreen or touch-sensitive display. In such circumstances, the interface 410 may be integrated with or combined with the microphone 416. When the interface 410 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 410 may be HDTV-capable. In some embodiments, the display 412 may be a 3D display. The speaker (or speakers) 414 may be provided as integrated with other elements of electronic device 400 or may be a stand-alone unit. In some embodiments, the display 412 may be outputted through speaker 414.

The equipment device 400 of FIG. 4 can be implemented in system 300 of FIG. 3 as primary equipment device 302, but any other type of user equipment suitable for allowing communications between smart doorbells and visitor mobile devices, smart doorbells in a neighborhood program, and smart doorbells and a server, for performing the functions related to screening visitor mobile devices, approving or denying communications between the screened visitor mobile devices and the smart doorbells, alerting doorbells in a neighborhood program if a distress (which may include a medical emergency) or suspicious activity is detected and performing all the functionalities discussed associated with the figures mentioned in this application.

Figure 5:
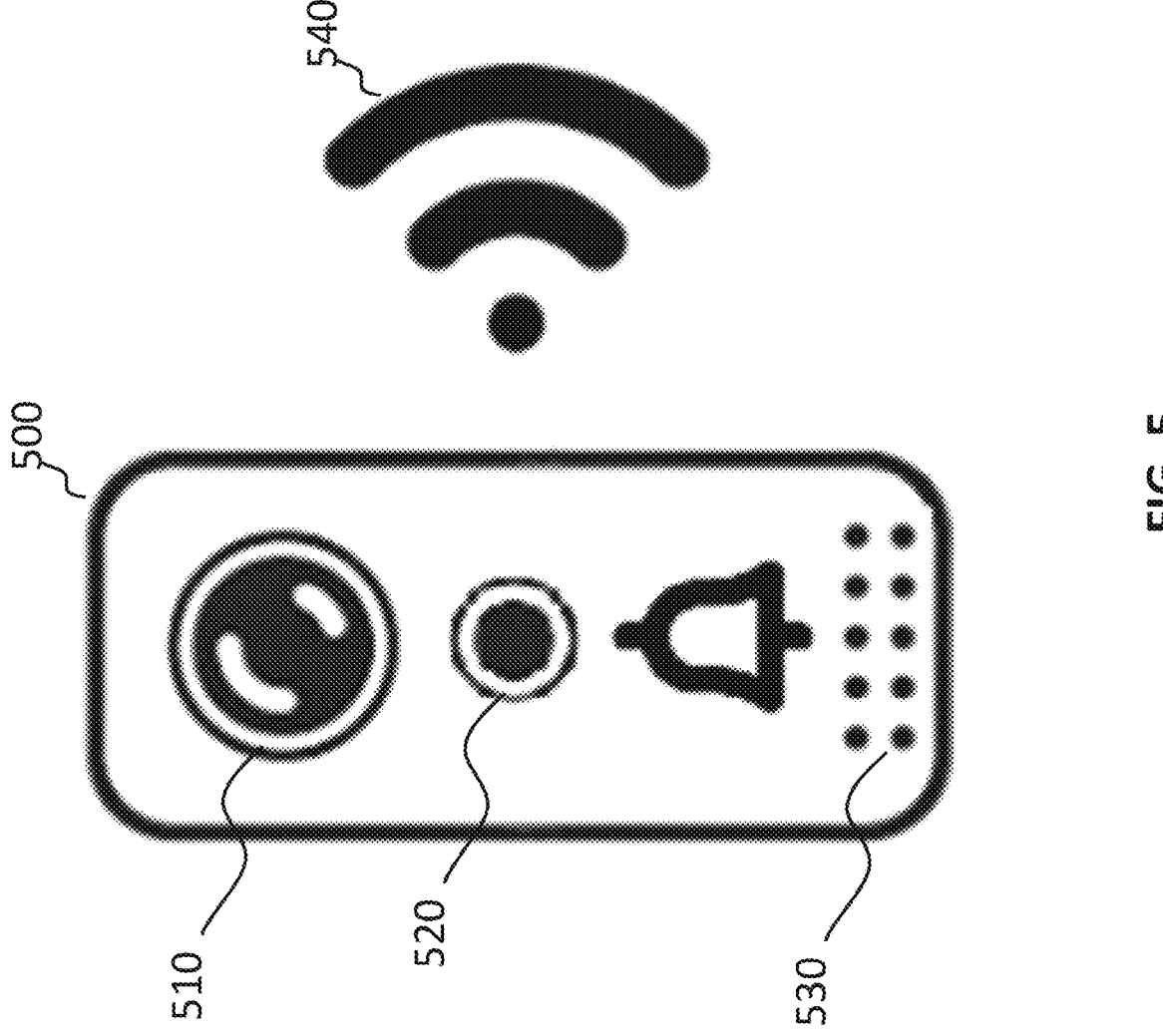
FIG. 5 is a block diagram of an example of a smart doorbell, in accordance with some embodiments of the disclosure.

FIG. 5 is a block diagram of an example of a smart doorbell, in accordance with some embodiments of the disclosure. In some embodiments, the smart doorbell 500 (also referred to as an intercom) may be a wireless device that may include a camera 510, a physical button 520 for pressing or ringing the smart doorbell, a speaker/microphone 530, and communication capability 540, such as Wi-Fi, to communicate with visitor mobile devices. Although not depicted in the figure, the smart doorbell may also include one or more sensors, such as sound or motion sensors for detecting sound and motion.

The camera of the smart doorbell may have a field of view that may capture the area surrounding the front door of a house or structure as well as other surrounding areas such as front of the house, street in front of the house, driveway, and other areas.

The microphone of the smart doorbell may be able to capture sounds in the vicinity of the doorbell. In some embodiments, the microphone may detect all sounds in the vicinity of the doorbell, and in other embodiments, the microphone may be configured to a certain decibel level such that only sounds above a certain decibel level are captured.

The motion sensor of the smart doorbell may be able to capture motion within a certain vicinity of the smart doorbell. Motion such as someone hiding in the bushes in front of the front door where the smart doorbell may be located may be captured by such motion sensors. In some embodiments, the motion sensor may detect all movement in the vicinity of the doorbell. In other embodiments, the motion sensor may be configured to capture the movement, and the smart doorbell, or a server associated with the smart doorbell, may use AI or ML to analyze the movement and distinguish the movement from routine or common movements such as a cat/dog walking across the yard. Although an example of a smart doorbell is depicted, the embodiments are not so limited. The smart doorbell may include other features or may not be a physical doorbell that is typically attached to a house or structure, such as near the main door, but instead may be a virtual doorbell that is integrated into an electronic device located inside the home or structure.

FIG. 6 is a diagram of a visitor mobile device communicating with a smart doorbell, in accordance with some embodiments of the disclosure. As described earlier, the geofence is created around the smart doorbell and acts as a boundary that is used to allow communications from visitor mobile devices that are within the created geofence. The geofence may either be created based on a map, such as in FIG. 9, or it may be created based on analyzing emitted beacons to determine location and orientation of a visitor mobile device with respect to the smart doorbell, such as in FIG. 10.

In some embodiments, the visitor mobile device 610, that is within a geofence created around the smart doorbell, may send a communication request to the smart doorbell 620. In one embodiment, the request may be a general request to communicate with the smart doorbell. In another embodiment, the request may be specific and describe the type of communication that the visitor mobile device 610 wishes to use to communicate with the smart doorbell 620 (e.g., ring the doorbell, call or video call with the resident of the home 630). In yet another embodiment, the request may be sent along with an electronic file that contains information identifying the visitor that may be relevant to the resident of the home to review and decide whether to communicate and what form of communication option to use to communicate with the visitor.

The smart doorbell 620 may receive the request and determine whether to provide communication access to the visitor mobile device 610. To make the determination, the smart doorbell 620, or control circuitry 320 and/or 328, may request further information from the visitor mobile device 610. For example, smart doorbell 620, or control circuitry 320 and/or 328, may request attributes and characteristics of the visitor mobile device 610. The smart doorbell 620, or control circuitry 320 and/or 328, may also request the purpose of the visit. In some embodiments, the smart doorbell 620, or control circuitry 320 and/or 328, may obtain such information through other sources, such as based on texts or other data exchanged previously between the smart doorbell 620 and the visitor mobile device 610 or based on images or video captured by a camera of the smart doorbell 620 (e.g., image captured shows a person wearing a pizza delivery uniform approaching the home 630).

Based on the information obtained and processed by the smart doorbell 620, or control circuitry 320 and/or 328, the smart doorbell 620 may approve the request to communicate that it received from the visitor mobile device.

In some embodiments, the smart doorbell 620 may query the visitor mobile device 610 for additional information to determine whether to approve the request to communicate or determine what type of communication should be approved. In other embodiments, the visitor mobile device 610 may provide the additional information on its own. In that regard, the platform may quickly transfer the conversation to allow the visitor mobile device 610 to send identification/contact information such as a virtual card format (.vcf)/vCard file to the resident of the home 630. Based on the vCard and other sources, a determination may be made that the visitor is an advertiser intending to distribute flyers to the resident of the home 630. The determination may be made based on the request received, the vCard, and/or other data obtained through the attributes or characteristics of the visitor mobile device 610, camera and other inputs in the smart doorbell (e.g., camera, microphone input), or the purpose of the visit indicated.

Based on the preferences stored in the smart doorbell 620, or control circuitry 320 and/or 328, on the type of communication to allow for an advertiser, such allowed communication options may be displayed on the visitor mobile device. In some embodiments, the preference may be to allow the visitor mobile device 610 that is determined to be an advertiser to electronically deliver marketing flyers, invoices, notices (rather than paper flyers, invoices, and notices) for events, products and services that are neighborhood- or yard-related. To maintain privacy of the resident of the home 630, a temporary email or phone number may be provided to the visitor mobile device 610 for sending such electronic information. This temporary email or phone number may be used to protect the resident's contact information while still allowing the advertising visitor to contact them using text, voice, video, etc. In other embodiments, the electronic information may be sent directly via a communication option presented on the visitor mobile device, such as "send file" or "send document."

In some embodiments, the communication session may be transferred away from the smart doorbell to the visitor mobile device, such as in the case of the advertiser described above where the advertiser is to provide a vCard, use the email/text to provide flyers, etc. By transferring the communication session away from the smart doorbell to the visitor mobile device, many modalities, such as allowing visitors to send pre-packaged media to the owner, rather than having limited communication options at the smart doorbell such as a live call or voicemail/video voicemail are provided. The ability to make this communication between the visitor mobile device 610 and the smart doorbell 620 asynchronous and visitor mobile device centric on both endpoints is advantageous to both the visitor and the home resident. For example, it protects the privacy of the resident of the home 630 while still allowing the visitor mobile device to give information in an electronic format, such as an electronic flyer, to the resident.

FIG. 7 is another diagram of a visitor mobile device communicating with a resident of a home where the smart doorbell is located, in accordance with some embodiments of the disclosure. In this embodiment, a visitor in an automobile 710 having a visitor mobile device may be parked in the vicinity of a smart doorbell 720 that is located at a home 730. As described earlier, a geofence is created around the smart doorbell 720. If the visitor mobile device is inside the automobile 710 are within the geofence boundary, then it may be provided a communication option to connect with the smart doorbell.

In FIG. 7, assuming the geofence boundary criterion is met, the visitor mobile device may be provided one or more types of communication options, such as the types of communication options in FIG. 8, to communicate with the smart doorbell 720 and/or the resident 740 of the home 730 without having to get out of the automobile in the rain. For example, if the visitor associated with the visitor mobile device is in the contact list of the smart doorbell or in the contact list of a mobile device of the resident 740, where the mobile device of the resident is connected to the smart doorbell, then a text or voice communication option may be displayed on the visitor mobile device. The communication may then be had between the resident 740 that is connected to the smart doorbell with the visitor mobile device via the smart doorbell 720, or the communication may be moved directly between the resident's mobile device and the visitor mobile device if the resident so approves. In some embodiments, the resident of the home may register their device, such as one or more mobile devices, on the smart doorbell platform such that it may communicate with the smart doorbell or with a visitor mobile device via the smart doorbell. In some embodiments, the visitor inside the automobile 710 may choose to send the text as depicted (e.g., "I just arrived, let's get on our way asap . . . "). The resident's mobile device may receive the text and the resident may respond, such as by texting "I'll be out in 2 minutes." Such response may be communicated to the visitor mobile device via the smart doorbell or directly from the resident's mobile device if the resident approves. In some embodiments, the smart doorbell may auto-initiate texts based on a communication from a visitor mobile device. For example, if a pizza delivery person or an Uber driver messages the smart doorbell, the auto-initiated text may state "I will be there in 2 minutes."

FIG. 8 is an example of types of communications allowed based on the attributes of a visitor mobile device and context of the visit, in accordance with some embodiments of the disclosure. In some embodiments, the types of communications allowed by the smart doorbell for a visitor mobile device to communicate with the smart doorbell may include press/ring doorbell, text, call, or video call (not shown) the doorbell or a resident's mobile device either directly or via the doorbell, send materials (not shown) such as flyers or other types of digital content and advertising to the smart doorbell, and leave a voice or video message (not shown) for the doorbell.

The smart doorbell 620, or control circuitry 320 and/or 328, may determine which type of communication to allow between the visitor mobile device and the smart doorbell based on any one or more pieces of information relating to the visitor mobile device and/or the visitor associated with the visitor mobile device. The one or more pieces of information may include information received along with a request from the visitor's mobile device to communicate with the smart doorbell. The one or more pieces of information may also include a vCard received by the smart doorbell. It may also include other data obtained through the attributes or characteristics of the visitor mobile device 610. It may also include any input via a camera, microphone, motion sensor, or other components of the smart doorbell, such as a video input captured by the smart doorbell. The one or more pieces of information may also include the reason for the visit by the visitor, if any is indicated by the visitor or determined by the smart doorbell. In other embodiments, the resident of the home where the smart doorbell is located may set a profile with a list of preferences on which type of communication to allow based on the one or more pieces of information obtained.

In some embodiments, the communication may be between the visitor mobile device and the smart doorbell. In other embodiments, the communication may be between the visitor mobile device and the mobile device associated with the resident of the home via the smart doorbell. In instances when the communication may be between the visitor mobile device and the mobile device associated with the resident of the home via the smart doorbell, the current status of the resident may be taken into consideration before determining which communication option to allow. For example, if the resident of the home is not properly dressed, is sleeping, or is busy, they may not want the video chat option to be presented to the visitor mobile device. In such instances, IoT devices in the house or the resident's mobile phone may obtain the current status of the resident, such as via a camera input, and determine that the video call communication option should not be allowed based on the current status.

Some examples of communication options that may be allowed and provided to the visitor mobile device are depicted in the table of FIG. 8. In one embodiment, at 810 Jane Doe 1 may be listed in the smart doorbell or the resident's mobile phone associated with the smart doorbell's contact list. Based on the contact list, and any other information stored along with their contact information, it may be determined that Jane Doe 1 is a friend of the resident. A further determination may be made, for example, based on previously exchanged text messages between the visitor and the resident, that the visitor was scheduled to visit the home.

Since the visitor is a known entity to the resident of the home where the smart doorbell is located, the smart doorbell may open up all communication options to the visitor (e.g., call, text, video call (not shown), etc.)

In another embodiment, at 820, John Doe 1 may be an advertiser and not listed in the contact list of the smart doorbell or the mobile phone of the resident associated with the smart doorbell. The determination that John Doe 1 is an advertiser may be obtained from a plurality of sources. For example, John Doe 1 may send his vCard indicating that he is an advertiser. In another example, a camera input of the smart doorbell may capture the visitor as someone wearing a uniform, and, based on such uniform, a determination may be made that the visitor is an advertiser. Accordingly, based on the communication preferences stored in the profile of the smart doorbell, the advertiser may only be provided a communication option that allows the advertiser to message the smart doorbell and provide flyers via a temporary email.

In yet another embodiment, at 830, a determination may be made that the visitor associated with the visitor mobile device is a neighbor of the resident where the smart doorbell is located. For example, a facial recognition may be performed to determine that the visitor is a neighbor since they are often within the FOV the smart doorbell or FOV of other smart doorbells in the neighborhood that are subscribed to a neighborhood watch and such information is obtained by the current smart doorbell. Even though the neighbor may not be listed in the contact list, based on previously set preferences, the type of communication for the neighbor may be to allow the neighbor to call or text the smart doorbell. A determination that the visitor is a neighbor may be based on the neighbor announcing themselves and indicating that they are a neighbor. It may also be based on the camera input of the smart doorbell frequently capturing the image of the person thereby increasing the likelihood that the visitor lives in the neighborhood.

In another embodiment, at 840, a determination may be made that the visitor is a gardener of the resident where the smart doorbell is located. Although that gardener may be in the contact list of the smart doorbell or the mobile device of the resident associated with the smart doorbell, the resident may not wish to engage in a conversation with the gardener and may rather just have the gardener text them whatever is needed via the smart doorbell.

In yet another embodiment, at 850, a determination may be made that the visitor is a pizza delivery person. As such, since the resident may be expecting the pizza delivery person, the platform may cause to display on the pizza delivery person's mobile phone a communication option that allows them to press/ring the doorbell before they approach the door of the home.

In another embodiment, at 860, information relating to the visitor may not be available. Further, the visitor may not be in the contact list of the smart doorbell, or the mobile device of the resident associated with the smart doorbell. As such, based on a previously set preference, the platform may not display any communication options on the visitor mobile device since the visitor is unknown to the resident of the home where the smart home doorbell is located. The platform may also only display a "ring doorbell" option on the visitor mobile device for a visitor who does not provide further information.

In another embodiment, at 870, the visitor may inform the smart doorbell that the visitor is a driver who is delivering a package, such as a FedEx™ driver or an ecommerce delivery person (e.g., Amazon™ truck driver). The driver may further inform the smart doorbell that a package is being delivered and a signature is required for the package to be left at the door. The smart doorbell may receive such information and provide the visitor a text option for communicating with the smart doorbell. Using this option, the visitor may provide information relating to the time of the delivery of the package and that a signature is needed. In some instance, an e-commerce system detecting that the driver is within the vicinity of the smart doorbell, based on the driver's GPS coordinates and an API on the driver's mobile phone connecting to the system, may also send a notification to the smart doorbell via the driver's mobile device, using the API, without the driver having to manually send the notification. The smart doorbell may inform the resident of the home that a package needs signature and in response, the resident may text back a digital signature that may be sent to the driver's mobile device authorizing the driver to leave the package at the door. The digital signature may be an encrypted secret between the e-commerce platform and the user. Since the resident may have connection via their mobile device to their smart doorbell, the resident may be remote and anywhere to avail this feature. They may benefit by using this feature to get their package that needs a signature delivered without having to wait at home for the package.

In another embodiment, at 880, the visitor may want to simply send some supplemental information, such as an electronic file that may contain their contact information, flyer, or other type of material to the resident of the house. Some of the information that the visitor intends to send may be important to the resident in terms of deciding whether they should open the door or interact remotely with the visitor using audio/video features of the doorbell. Accordingly, the smart doorbell may enable the visitor to send an electronic information to the smart doorbell, which may then be transmitted to a mobile device of the resident. Once the resident reviews the file, the resident may decide whether or not to communicate with the visitor. If the resident decides to communicate, they may determine which communication option to use, such as talk, text, voice message, provide email etc. Using this feature may facilitate new interactions that may benefit the resident as well as the visitor (e.g., resident opens the door for a visitor if they are actually interested in seeing/talking to the visitor or a product they are selling.)

FIG. 9 is a block diagram of an example of a user interface rendering a map when location-based geofencing is available, in accordance with some embodiments of the disclosure. In this embodiment, the visitor mobile device may access a map, for example, from public sources such as Google Maps™, Apple Maps™, etc. It may also obtain a map, if available, via the cloud API from the platform provider. The visitor mobile device, using the obtained map, may generate on its UI a map of all the smart doorbells that are within a predetermined vicinity of the visitor mobile device based on the geofence boundaries of the smart doorbells within which the visitor mobile device is located. As depicted in FIG. 9, visitor 910 via their visitor mobile device may detect smart doorbells 920-960 that are within a predetermined vicinity of the visitor mobile device.

Since the visitor mobile device is likely going to a particular home, such as the home located at 5957 Adeia Way having a smart doorbell 940 (e.g., the Nest™ smart doorbell as depicted), the visitor mobile device may select smart doorbell 940 from all the smart doorbells 920-960 displayed on the UI of the visitor mobile device and send a request to communicate to the smart doorbell 940.

In some embodiments, if the visitor mobile device selects multiple smart doorbells at a time (or within a predetermined period of each other), then the neighborhood watch system, as described in relation to FIG. 2, may analyze such a selection and determine whether it meets the criteria of a suspicious activity. The neighborhood watch system may also prevent a single visitor mobile device from pressing multiple smart doorbells within a predetermined period of time to prevent mischief or pranks.

Figure 10:
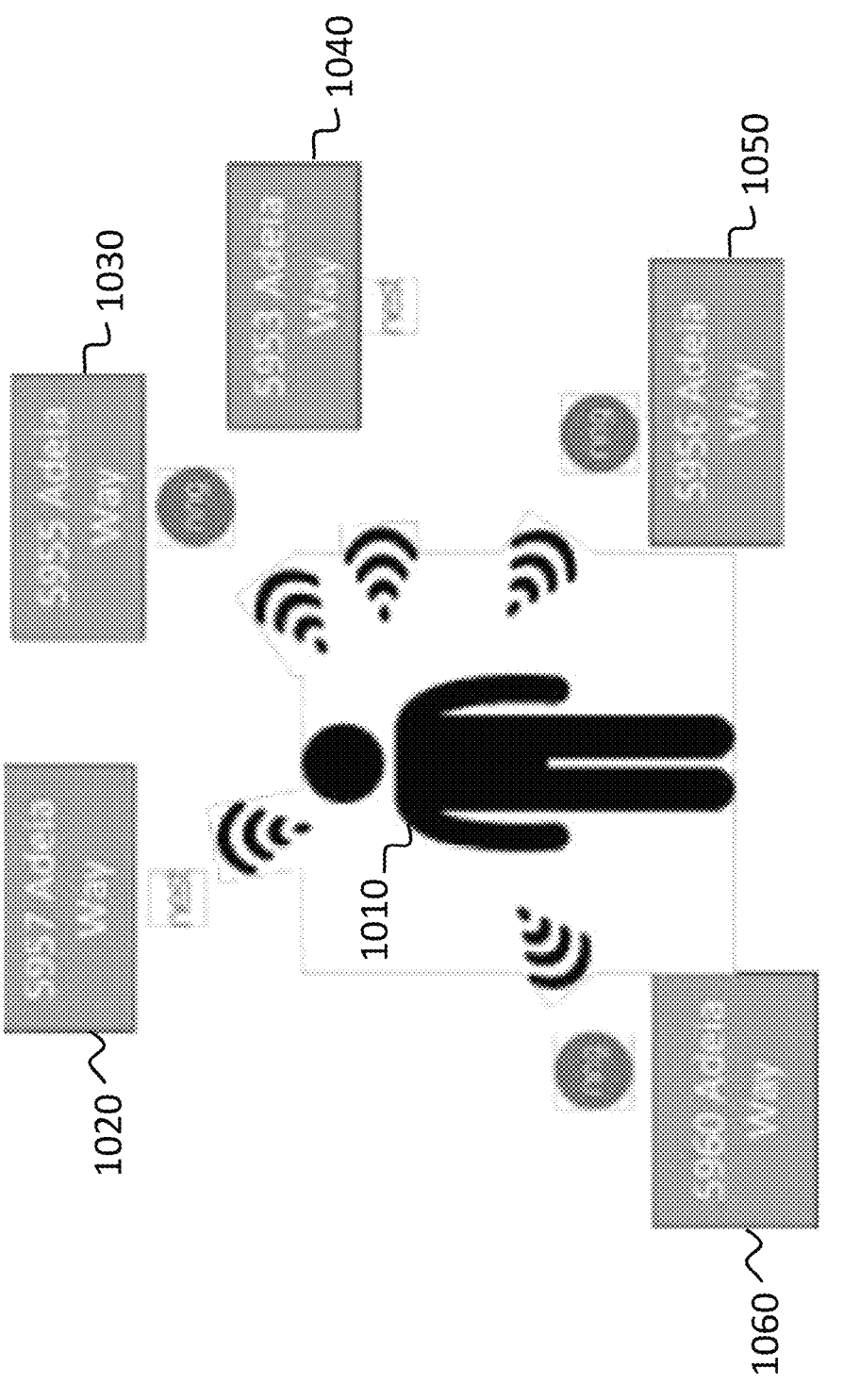
FIG. 10 is a block diagram depicting use of beacons to determine location and orientation of a visitor mobile device with respect to the smart doorbell, in accordance with some embodiments of the disclosure.

FIG. 10 is a block diagram depicting use of beacons to determine location and orientation of a visitor mobile device with respect to the smart doorbell, in accordance with some embodiments of the disclosure. In some embodiments, a map, such as the map described in relation to FIG. 9, may not be available. In such circumstances, the visitor mobile device may receive the make/model of the smart doorbell, as well as the associated address, from a beacon emitted from the smart doorbell. Based on the address and the current location of the visitor mobile device, which may be determined based on its GPS coordinates, the visitor mobile device may be able to determine the distance from the visitor mobile device to the smart doorbell.

The visitor mobile device may also use an angle of arrival (AoA) technique to determine the direction of a doorbell relative to the visitor mobile device. Using this AoA technique, the visitor mobile device may receive the beacon emitted from the smart doorbell. An angle of arrival of the received beacon may be calculated by the visitor mobile device.

Based on the calculated AoA of the received beacon and the distance between the visitor mobile device and the smart doorbell, the visitor mobile device may be able to determine the distance and orientation of the visitor mobile device to each of the smart doorbells within its vicinity.

Based on the distance and relative orientation determined, the UI of the visitor mobile device associated with the visitor 1010 may display smart doorbells 1020-1060 that are within a predetermined vicinity of the visitor mobile device.

Since the visitor mobile device is likely going to a particular home, such as home located at 5957 Adeia Way having a smart doorbell 1020 (e.g., the Nest™ smart doorbell as depicted), the visitor mobile device may select smart doorbell 1020 from all the smart doorbells 1020-1060 displayed on the UI of the visitor mobile device and send a request to communicate to the smart doorbell 1020.

In some embodiments, if the visitor mobile device selects multiple smart doorbells at a time (or within a predetermined period of each other), then the neighborhood watch system, as described in relation to FIG. 2, may analyze such a selection and determine whether it meets the criteria of a suspicious activity. The neighborhood watch system may also prevent a single visitor mobile device from pressing multiple smart doorbells within a predetermined period of time to prevent mischief or pranks.

FIG. 11 is a flowchart of a process 1100 for establishing a peer-to-peer link between the smart doorbell and the visitor mobile device, in accordance with some embodiments of the disclosure. The process 1100 may be implemented, in whole or in part, by systems or devices such as those shown in FIGS. 3-4. One or more actions of the process 1100 may be incorporated into or combined with one or more actions of any other process or embodiments described herein. The process 1100 may be saved to a memory or storage (e.g., any one of those depicted in FIGS. 3-4) as one or more instructions or routines that may be executed by a corresponding device or system to implement the method 1100.

In some embodiments, at block 1105, a visitor mobile device (may also be referred to as user or user mobile device), monitors for smart wireless doorbell beacons. Since smart doorbells may emit a beacon, this emitted beacon may be received and analyzed by the visitor mobile device. In some embodiments, the visitor mobile device may find a plurality of smart doorbells. The find may be based on the visitor mobile device receiving a plurality of beacons from a plurality of smart doorbells.

At block 1110, a determination may be made whether any smart doorbells are found, through the monitoring at block 1105, within a vicinity of the visitor mobile device. The vicinity may be a predetermined distance from the visitor mobile device or within a geofence created around the smart doorbell. If a determination is made that any one or more of the doorbells found are not within the vicinity of the visitor mobile device, then the process may revert to block 1105, where the visitor mobile device continues to monitor for smart doorbells that are within the vicinity of the visitor mobile device.

If a determination is made that any one or more of the doorbells found are within vicinity of the visitor mobile device, then the process may move to block 1115, where a peer to peer (P2P) communication between the visitor mobile device and the smart doorbell may be initiated. If a determination is made that any one or more of the doorbells found are within vicinity of the visitor mobile device, the visitor mobile device may update its current list of smart doorbells and display a list of all the doorbells found that are within the vicinity on a UI of the visitor mobile device. In addition to displaying the smart doorbells on the UI, the visitor mobile device may display any other information received in the beacon from the smart doorbell, such as notes, address, name of resident, etc.

Since the visitor associated with the visitor mobile device may intend to approach a particular a smart doorbell associated with a particular home, the visitor associated with the visitor mobile device may select a particular smart doorbell, from the plurality of smart doorbells listed or displayed on the visitor mobile device's UI.

At block 1120, as part of the P2P communication, once the particular smart doorbell is selected there may be an encrypted message exchanged between the visitor mobile device and the smart doorbell. This exchange may involve first exchanging public keys between the selected smart doorbell and the visitor mobile device. Following the exchange of the public keys, a symmetric key (typically generated by the visitor mobile device) using asymmetric key encryption may be exchanged. Following the exchange of the symmetric key between the visitor mobile device and selected smart doorbell, a secure encrypted communication link may be set up for allowing encrypted communications between the smart doorbell and the visitor mobile device.

At block 1125, a UI may be rendered on the visitor mobile device with capability to press or ring the smart doorbell.

At blocks 1130 and 1135, once the secure encrypted communications between the smart doorbell and the visitor mobile device have been set up, in one embodiment, the visitor mobile device may send an electronic file together with a doorbell press. Such an electronic file may be in a variety of formats, such as a contact card format file, a pdf file, a media file such as an audio or video introduction, etc. In some embodiments, the visitor associated with the visitor mobile device may select which electronic file, among a plurality of electronic files stored in the visitor mobile device, to send. The visitor associated with the visitor mobile device may also select what information to send in the selected electronic file to the smart doorbell. If the visitor mobile device does not select an electronic file to send to the smart doorbell, then the process may move to block 1140, where the visitor mobile device may await a decision by the smart doorbell, which may include a decision to allow or not allow further communications with the visitor mobile device. If the visitor mobile device selects the electronic file to send to the smart doorbell, then the process may move to block 1135, where the selected electronic file may be prepared and transmitted to the selected smart doorbell along with a doorbell press.

In another embodiment, once the secure encrypted communications between the smart doorbell and the visitor mobile device have been set up, the visitor mobile device may either send a general request to communicate to the smart doorbell or send a specific request to communicate and the type of communication desired (e.g., text, video, voice note {which may be automatically transcribed by the smart doorbell}, send materials, etc.). In some embodiments, the smart doorbell may need to approve the request (general or specific), and only when the request is approved may the UI display an option to press/ring the smart doorbell or use other types of communication options to communicate with the smart doorbell.

At block 1145, if a determination is made that the smart doorbell button, icon, or some other selectable feature has been pressed on the visitor mobile device, then at block 1150, a message may be sent from the visitor mobile device to the smart doorbell using the P2P link. By transferring the doorbell press over to the visitor mobile device, the visitor associated with the visitor mobile device may be able to better inform the owner or resident of the home where the smart doorbell is located of their purpose in visiting (e.g., pick up someone, pizza delivery, advertisement for XYZ product, neighbor inviting to a block party, etc.)

If a determination is made, at block 1145, that the smart doorbell button, icon, or some other selectable feature has not been pressed on the visitor mobile device, then the process may move to block 1180 where a determination is made whether the visitor mobile device is still within the vicinity or within the geofence area of the smart doorbell. If it is still within the vicinity, then the system may continue to monitor at block if the smart doorbell has been pressed. If it is not within the vicinity, then, at block 1185, the smart doorbell may be removed from the UI of the visitor mobile device.

Referring back to block 1150, once the message is sent from the visitor mobile device to the smart doorbell using the P2P link, the smart doorbell may receive the message and in response, at block 1155, may message the owner or resident of the home where the smart doorbell is located via a cloud API.

At block 1160, the owner or resident of a home where the smart doorbell is located may respond to the message received on their mobile device. If the owner/resident does not respond, then the process may move to blocks 1180 and 1185. If the owner/resident responds, then, at block 1165, the smart doorbell may initiate a session to the owner's mobile device such that the visitor mobile device and the owner/ resident mobile device may communicate (either directly or via the smart doorbell). The smart doorbell may tunnel data between the visitor mobile device and the resident/owner mobile device, as depicted at block 1170. Accordingly, the smart doorbell continues to act as a bridge between the visitor mobile device (reachable via the P2P link) and the owner/resident mobile device (reachable via the cloud API). Once communication is completed, at block 1175, the session may be terminated.

In some embodiments, instead of involving the owner/resident such as at block 1155-1165, the smart doorbell, or a server associated with the smart doorbell, may determine whether to allow further communication between the visitor mobile device and the smart doorbell based on one or more pieces of information received. For example, the smart doorbell may receive a vCard from the visitor mobile device. It may also receive other information, such as attributes or characteristics of the visitor mobile device, or inputs through components of the smart doorbell (e.g., camera, microphone input). It may also receive information relating to the purpose of the visit. Based on the information received, the smart doorbell may determine whether to allow any further communications with the visitor mobile device, and if it is to allow further communications, it may determine the type of communications (e.g., text, call, video call) to allow such that the mobile device may use only the allowed type of communication to communicate with the smart doorbell.

FIG. 12 is a flowchart of a process 1200 of communication between the visitor mobile device and a cloud server, in accordance with some embodiments of the disclosure. The process 1200 may be implemented, in whole or in part, by systems or devices such as those shown in FIGS. 3-4. One or more actions of the process 1200 may be incorporated into or combined with one or more actions of any other process or embodiments described herein. The process 1200 may be saved to a memory or storage (e.g., any one of those depicted in FIGS. 3-4) as one or more instructions or routines that may be executed by a corresponding device or system to implement the method 1200.

The embodiment of FIG. 12 may provide a similar approach as described in relation to FIG. 11, except that in FIG. 12, the visitor mobile device does not use the smart doorbell as a bridge to communicate with the smart doorbell platform or owner/resident mobile device. Instead, the visitor mobile device may directly query a cloud server using its location to get a list of candidate doorbells for communication. If the resident/owner responds to a doorbell press, then the session, such as a video call, text, etc., is established directly by the cloud server between the visitor and resident/owner's mobile device, without intervention from the actual doorbell device.

Figure 13:
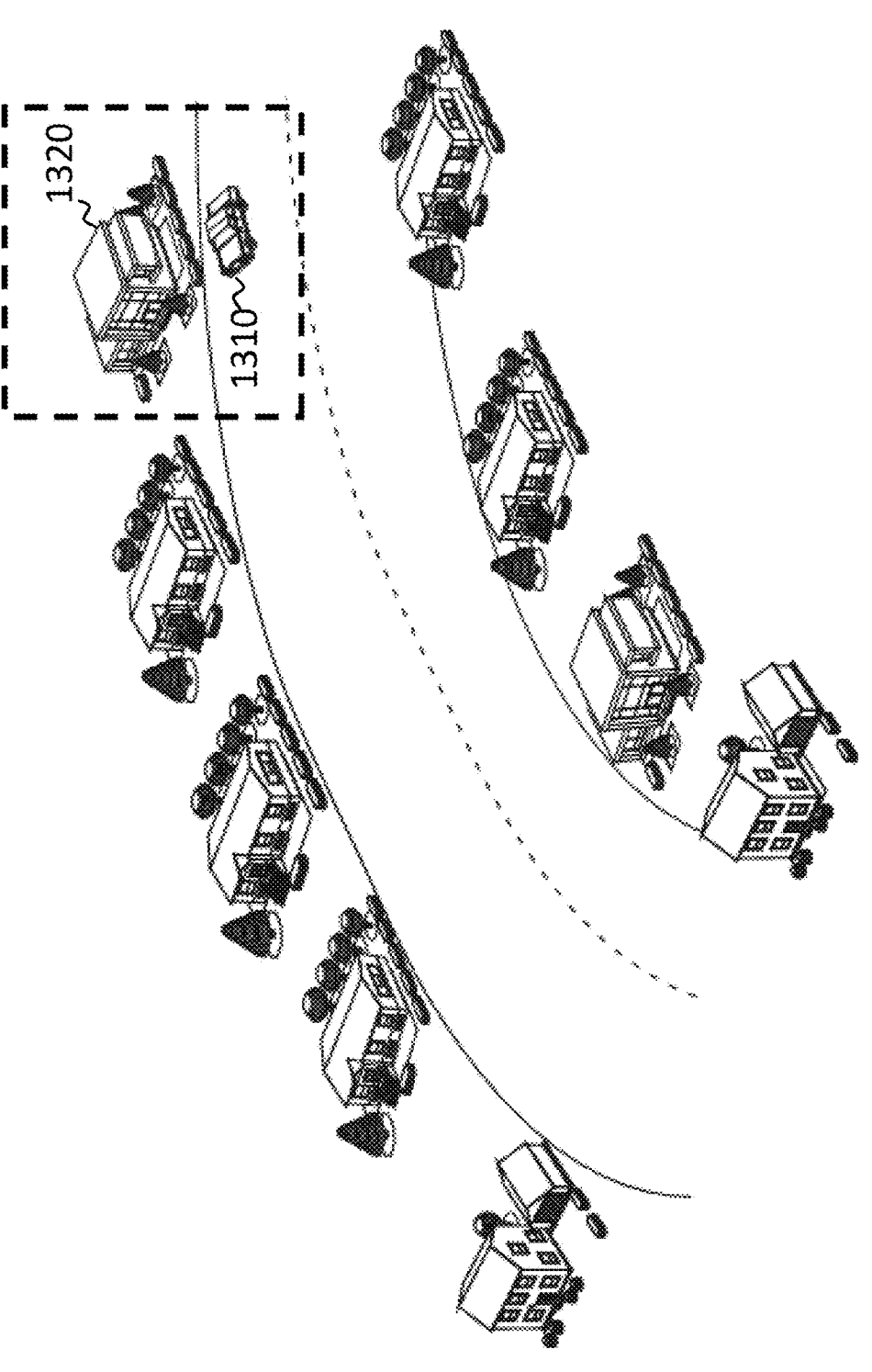
FIG. 13 is a block diagram of a plurality of homes with doorbells that has joined a neighborhood watch program, in accordance with some embodiments of the disclosure.
Figure 14:
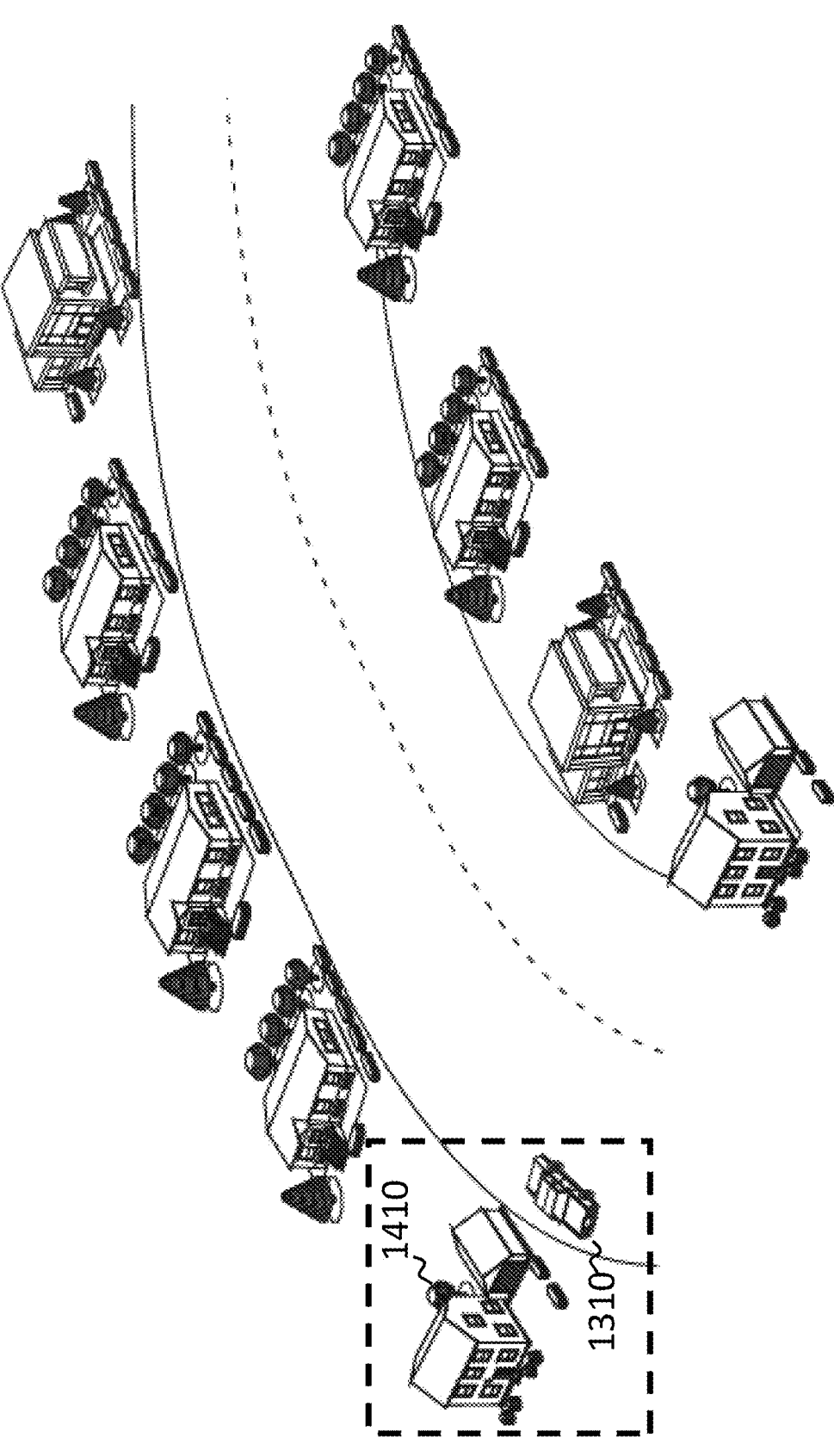
FIG. 14 is another block diagram of a plurality of homes with doorbells that has joined a neighborhood watch program, in accordance with some embodiments of the disclosure.

FIGS. 13 and 14 are block diagrams of a plurality of homes with doorbells that has joined a neighborhood watch program, in accordance with some embodiments of the disclosure. In some embodiments, a server may transmit a request to a plurality of doorbells in a neighborhood or within a vicinity to join a neighborhood watch program. All the smart doorbells that accept the received request may be joined into the neighborhood watch program. The smart doorbells may also query for a neighborhood watch program in their neighborhood and send a join request directly to the server to join the neighborhood watch program. In another embodiment, one smart doorbell may transmit a message or a beacon to its closest neighbor, such as a next-door neighbor, providing them a link to join a neighborhood watch program to which they are subscribed.

Once joined into the neighborhood watch program, the smart doorbells may directly communicate with each other or communicate via a server associated with the neighborhood watch program. The neighborhood watch program may allow each smart doorbell to monitor activity in their space and report the activity to the server for analysis. The activity may be detected via various components of the smart doorbell (e.g., camera, microphone, sound or motion sensors, etc.). The activity may also be detected based on a wireless signal received from the smart doorbell.

The activity detected may then be transmitted to the server associated with the neighborhood watch. The server may analyze all activity received and determine if the activity is suspicious. Some examples of suspicious activity may include a break in, a burglary, or a robbery. To analyze the activity, the server may utilize an artificial intelligence (AI) engine to execute an AI algorithm to determine whether the activity detected meets the criteria of a suspicious activity. If it does, then the server may transmit an alert to all the smart doorbells in the neighborhood watch group alerting them of the suspicious activity and alerting them to take remedial measures to be safe. Such remedial measures may include activating IoT devices, such as turning on lights or turning on a television, so as to deter a burglar.

In some embodiments, the activity may be reported by multiple smart doorbells. For example, as depicted in FIG. 13, a car 1310 may be parked outside a house having a smart doorbell 1320. Such activity may be reported to the server by the smart doorbell 1320. The smart doorbell 1320 may also report an amount of time, at what time of day, and other details relating to the parked car 1310. The smart doorbell 1410 in FIG. 14 may also report the same car 1310 parked in front of the house where the smart doorbell 1410 is located. The smart doorbell 1410 may also report an amount of time, a time of day, and other details relating to the parked car 1310.

Although the activity reported by the smart doorbell 1320 or 1410 by itself may not rise to the level of a suspicious activity, the server may collectively analyze data provided by multiple smart doorbells to determine whether the activity collectively rises to the level of a suspicious activity. In this example, the car 1310 may not be recognized by the reporting doorbells 1320 and 1410. The server may determine based on the amount of time the car was parked that potentially someone may be staking out in the neighborhood and watching to potentially perform an illegal act, such as a burglary. But since such data alone may also not be sufficient to determine whether the behavior constitutes a suspicious activity, the server may take additional steps to determine whether the activity reported by smart doorbells 1320 and 1410 rises to the level of a suspicious activity. For example, the server may query all the other smart doorbells that are joined into the neighborhood watch program to determine if they recognize the automobile. The server may also cross-reference license plates of the parked car with DMV records. The server may also determine if the car has been reported stolen or is the subject of an Amber Alert. Data from all the doorbells in the neighborhood is received, along with any additional data, such as from the DMV, or police records. The server may collectively analyze all data to determine whether the activity collectively rises to the level of a suspicious activity. If it does, then an alert may be sent out to all the smart doorbells in the neighborhood watch program alerting them of the parked car.

It will be apparent to those of ordinary skill in the art that methods involved in the above-described embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. It should also be noted that the systems and/or methods described above may also apply to audio and video engagement by participants during the live streaming session and are not limited to chat messages.

What is claimed is:

1. A method comprising:
detecting a visitor mobile device within a predetermined vicinity of a smart doorbell;
causing for display, on the visitor mobile device, a request to virtually communicate with the smart doorbell;
receiving a selection of the request and attributes associated with the visitor mobile device;
comparing the attributes to a restricted list;
determining, based on the comparison, whether any of the attributes associated with the visitor mobile device match any attributes on the restricted list;
approving the received request to virtually communicate with the smart doorbell based on the received attributes based on determining that none of the attributes associated with the visitor mobile device match any attributes on the restricted list; and
denying the received request to virtually communicate with the smart doorbell based on the determining that at least one of the attributes associated with the visitor mobile device match at least one of the attributes on the restricted list.

2. The method of claim 1, further comprising:
approving the received request to virtually communicate with the smart doorbell; and
displaying on the visitor mobile device, one or more communication options for wirelessly communicating with the smart doorbell.

3. The method of claim 2, further comprising:
establishing a wireless connection between the smart doorbell and a host device, wherein the host device is associated with a resident of a structure to which the smart doorbell is attached; and
providing a first communication option, from the one or more communication options displayed on the visitor mobile device, to communicate with the host device.

4. The method of claim 3, wherein the first communication option includes any one of ring, text, voice call, video call, send image, or send voice or video message.

5. The method of claim 1, wherein the predetermined vicinity of the smart doorbell is defined by a geofence created around the smart doorbell.

6. The method of claim 5, further comprising:
detecting whether the visitor mobile device is within the geofence created around the smart doorbell, wherein the detection comprises:

transmitting a radio frequency (RF) beacon at a controlled power from the smart doorbell; and
determining that the visitor mobile device is within the geofence created around the smart doorbell if the transmitted RF beacon is received by the visitor mobile device.

7. The method of claim 1, further comprising:
approving the received request to virtually communicate with the smart doorbell; and
causing to display on the visitor mobile device, an option to virtually ring the smart doorbell.

8. The method of claim 7, further comprising:
receiving a selection of the option to virtually ring the smart doorbell; and
in response to receiving the selection, audibly ringing the smart doorbell to its connected speaker.

9. The method of claim 1, further comprising:
determining whether any of the attributes, from the received attributes associated with the visitor mobile device, match an attribute in a host device's preferred list; and
approving the received request to virtually communicate with the smart doorbell in response to determining a match.

10. The method of claim 1, further comprising:
establishing a temporary phone number or an email for the smart doorbell; and
transmitting the temporary phone number or email to the visitor mobile device in response to the received request to virtually communicate with the smart doorbell.

11. A system comprising:
communications circuitry configured to access a smart doorbell; and
control circuitry configured to:
detect a visitor mobile device within a predetermined vicinity of the smart doorbell;
cause for display, on the visitor mobile device, a request to virtually communicate with the smart doorbell;
receive a selection of the request and attributes associated with the visitor mobile device;
compare the attributes to a restricted list;
determine, based on the comparison, whether any of the attributes associated with the visitor mobile device match any attributes on the restricted list;
approve the received request to virtually communicate with the smart doorbell based on the received attributes based on determining that none of the attributes associated with the visitor mobile device match any attributes on the restricted list; and
deny the received request to virtually communicate with the smart doorbell based on the determining that at least one of the attributes associated with the visitor mobile device match at least one of the attributes on the restricted list.

12. The system of claim 11, further comprising, the control circuitry configured to:
approve the received request to virtually communicate with the smart doorbell; and
display on the visitor mobile device, one or more communication options for wirelessly communicating with the smart doorbell.

13. The system of claim 11, further comprising, the control circuitry configured to:
establish a wireless connection between the smart doorbell and a host device, wherein the host device is associated with a resident of a structure to which the smart doorbell is attached; and provide a first communication option, from the one or more communication options displayed on the visitor mobile device, to communicate with the host device.

14. The system of claim 13, wherein the first communication option includes any one of ring, text, voice call, video call, send image, or send voice or video message.

15. The system of claim 11, wherein the predetermined vicinity of the smart doorbell is defined by a geofence created around the smart doorbell.

16. The system of claim 15, further comprising, the control circuitry configured to:

detect whether the visitor mobile device is within the geofence created around the smart doorbell, wherein the detection comprises, the control circuitry further configured to:

transmit a radio frequency (RF) beacon at a controlled power from the smart doorbell; and determine that the visitor mobile device is within the geofence created around the smart doorbell if the transmitted RF beacon is received by the visitor mobile device.

17. The system of claim 11, further comprising, the control circuitry configured to:

approve the received request to virtually communicate with the smart doorbell; and cause to display on the visitor mobile device, an option to virtually ring the smart doorbell.

18. The system of claim 17, further comprising, the control circuitry configured to:

receive a selection of the option to virtually ring the smart doorbell; and in response to receiving the selection, audibly ring the smart doorbell to its connected speaker.

19. The system of claim 11, further comprising, the control circuitry configured to:

determine whether any of the attributes, from the received attributes associated with the visitor mobile device, match an attribute in a host device's preferred list; and approve the received request to virtually communicate with the smart doorbell in response to determining a match.

\* \* \* \* \*